US007144469B2

(12) United States Patent
McCarthy et al.

(10) Patent No.: US 7,144,469 B2
(45) Date of Patent: Dec. 5, 2006

(54) METHOD OF FORMING A PRINTABLE MEDIA SHEET CONSTRUCTION

(75) Inventors: Brian R. McCarthy, Anaheim Hills, CA (US); Steven Craig Weirather, Lawrenceville, GA (US); Charles Thurmond Patterson, Clermont, GA (US); Tony Lee Scroggs, Oakwood, GA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 11/024,665

(22) Filed: Dec. 29, 2004

(65) Prior Publication Data

US 2005/0112317 A1 May 26, 2005

Related U.S. Application Data

(60) Division of application No. 09/400,170, filed on Sep. 21, 1999, now Pat. No. 6,837,955, which is a continuation-in-part of application No. 09/158,728, filed on Sep. 22, 1998, and a continuation-in-part of application No. 09/158,308, filed on Sep. 22, 1998.

(51) Int. Cl.
*B32B 37/02* (2006.01)

(52) U.S. Cl. ...................... 156/257; 156/253; 156/259; 156/268; 156/265; 156/270; 156/271; 156/277; 283/70; 283/75; 83/39; 83/880

(58) Field of Classification Search ................ 156/252, 156/253, 257, 259, 268, 270, 271, 277, 265; 428/42.3; 283/70, 75; 83/880, 39
See application file for complete search history.

(56) References Cited

U.S. PATENT DOCUMENTS

| | | | | |
|---|---|---|---|---|
| 1,865,741 | A | | 7/1932 | Carney |
| 2,434,545 | A | | 1/1948 | Brady, Jr. et al. |
| 2,681,732 | A | | 6/1954 | Brady |
| 2,883,044 | A | | 4/1959 | Kendrick |
| 3,140,215 | A | * | 7/1964 | Russell ........................ 53/484 |
| 3,239,478 | A | | 3/1966 | Harlan, Jr. |
| 3,269,278 | A | * | 8/1966 | Olstad ........................ 493/197 |
| 3,361,252 | A | | 1/1968 | Wise |
| 3,380,871 | A | * | 4/1968 | Thomas ...................... 156/314 |
| 3,420,364 | A | | 1/1969 | Kennedy, Jr. |
| 3,568,829 | A | | 3/1971 | Brady, Jr. |
| 3,769,147 | A | | 10/1973 | Komendat et al. |
| 3,854,229 | A | | 12/1974 | Morgan |
| 4,004,058 | A | | 1/1977 | Buros et al. |
| 4,020,204 | A | | 4/1977 | Taylor et al. |
| 4,048,736 | A | | 9/1977 | Castleman et al. |

(Continued)

FOREIGN PATENT DOCUMENTS

| | | | |
|---|---|---|---|
| AU | B-50060/90 | 8/1990 | AU |
| A-88325/91 | | 6/1992 | CA |
| 2148553 | | 5/1995 | DE |
| 2257435 | | 12/1984 | |

(Continued)

OTHER PUBLICATIONS

Fasson Roll Division (circa 1986) 14 pages.
Fasson Dry Technology Products (circa 1986) 13 pages.

(Continued)

*Primary Examiner*—Linda Gray
(74) *Attorney, Agent, or Firm*—Jeffer, Mangels, Butler & Marmaro, LLP

(57) ABSTRACT

A method of forming a printable media sheet construction, including: (a) cutting cross-direction lines through a card-stock web; (b) after step (a), laminating a plurality of strips to the web; and (c) after step (b), cutting machine-direction lines through the web and to the strips on the opposite side of the web.

52 Claims, 30 Drawing Sheets

U.S. PATENT DOCUMENTS 4,051,285 A 9/1977 Kramer
4,128,954 A 12/1978 White
4,150,183 A 4/1979 Reed
4,243,458 A 1/1981 Giulie
4,368,903 A 1/1983 Jones
4,380,564 A 4/1983 Cancio
4,405,401 A 9/1983 Stahl
4,447,481 A 5/1984 Holmberg et al.
4,465,729 A 8/1984 Cancio
4,528,054 A 7/1985 Stahl et al.
4,548,845 A 10/1985 Parsons et al.
4,549,063 A 10/1985 Ang et al.
4,560,600 A 12/1985 Yellin et al.
4,704,317 A 11/1987 Hickenbotham et al.
4,732,069 A 3/1988 Wood et al.
4,833,122 A 5/1989 Doll et al.
4,858,957 A 8/1989 Capozzola
4,863,772 A 9/1989 Cross
4,873,643 A 10/1989 Powell et al.
4,882,211 A * 11/1989 McIntyre et al. .......... 428/41.6
4,940,258 A 7/1990 Cuba, Jr. et al.
5,039,652 A 8/1991 Doll et al.
5,090,733 A 2/1992 Bussiere
5,100,728 A * 3/1992 Plamthottam et al. ...... 428/345
5,132,915 A 7/1992 Goodman
5,135,789 A 8/1992 Schmidt
5,139,836 A 8/1992 Burke
5,198,275 A 3/1993 Klein
5,209,810 A 5/1993 Marschke
5,219,183 A 6/1993 McKillip
5,238,269 A 8/1993 Levine
5,262,216 A 11/1993 Popat et al.
5,288,714 A 2/1994 Marschke
5,340,427 A 8/1994 Cusack
5,389,414 A 2/1995 Popat
5,403,236 A 4/1995 Greig
5,407,718 A 4/1995 Popat et al.
5,413,532 A 5/1995 Raby
5,416,134 A 5/1995 Skoglund
5,418,026 A 5/1995 Dronzek, Jr. et al.
5,462,783 A 10/1995 Esselmann
5,466,013 A 11/1995 Garrison
5,495,981 A 3/1996 Warther
5,509,693 A 4/1996 Kohls
5,530,793 A 6/1996 Watkins
5,534,320 A 7/1996 Raby
5,543,191 A 8/1996 Dronzek, Jr. et al.
5,558,454 A 9/1996 Owen
5,571,587 A 11/1996 Bishop et al.
5,589,025 A 12/1996 Garrison
5,595,403 A 1/1997 Garrison
5,599,128 A 2/1997 Steiner
5,632,842 A 5/1997 Oliver
5,656,705 A 8/1997 Mallya et al.
5,670,226 A 9/1997 Yoshizawa et al.
5,702,789 A 12/1997 Fernandez-Kirchberger et al.
5,730,826 A 3/1998 Sieber et al.
5,735,453 A * 4/1998 Gick et al. ................. 229/92.8
5,766,398 A 6/1998 Cahill et al.
5,769,457 A 6/1998 Warther
5,782,497 A 7/1998 Casagrande
5,793,174 A 8/1998 Kovach et al.
5,825,996 A 10/1998 Davis et al.
5,842,722 A 12/1998 Carlson
5,853,837 A 12/1998 Popat
5,885,678 A 3/1999 Malhotra
5,890,743 A 4/1999 Garrison et al.
5,908,209 A 6/1999 Carides et al.
5,947,525 A 9/1999 Pollman
5,948,494 A 9/1999 Levin
5,976,294 A 11/1999 Fagnant et al.
5,985,075 A 11/1999 Freedman
5,993,928 A 11/1999 Popat
5,997,680 A 12/1999 Popat
5,997,683 A 12/1999 Popat
6,001,209 A 12/1999 Popat et al.
6,033,751 A 3/2000 Kline
6,074,747 A 6/2000 Scholz et al.
6,099,927 A 8/2000 Freedman
6,103,326 A 8/2000 Kobayashi
6,110,552 A * 8/2000 Casey et al. ............... 428/40.1
6,126,773 A 10/2000 Fernandez-Kirchberger et al.
6,135,504 A 10/2000 Teng
6,135,507 A 10/2000 Hamby et al.
6,136,130 A 10/2000 Tataryan et al.
6,173,649 B1 1/2001 Onishi
6,217,078 B1 4/2001 Roth et al.
6,221,192 B1 * 4/2001 Walsh ........................ 156/257
6,256,109 B1 7/2001 Rosenbaum et al.
6,277,456 B1 8/2001 Bulgrin et al.
6,328,340 B1 12/2001 Fischer
6,331,018 B1 12/2001 Roth et al.
6,340,512 B1 1/2002 Mercer et al.
6,352,608 B1 3/2002 Garden
6,379,760 B1 4/2002 Tang
6,482,490 B1 11/2002 Hanahara et al.
6,837,955 B1 1/2005 McCarthy et al.
2002/0096874 A1 7/2002 Viby

FOREIGN PATENT DOCUMENTS

DE G 88 07 521 9/1988
DE 42 40 825 12/1992
DE 19741 563 9/1996
DE 19519584 12/1996
DE 19741563 3/1998
DE 29805481 9/1998
DE 29907361 3/2000
DE 19945254 8/2001
DE 69909841 5/2004
EP 0126312 11/1984
EP 0 299 598 1/1988
EP 0 334 584 * 9/1989
EP 0 341 328 11/1989
EP 0 416 862 3/1991
EP 0 514 625 11/1992
EP 0 613 792 9/1994
EP 0 658 423 6/1995
EP 0 690 794 4/1998
EP 0 987 670 3/2000
EP 0987195 3/2000
EP 0 765 514 9/2000
EP 1274619 1/2003
FR 1586336 1/1970
JP 05-318672 12/1993
NO 156959 2/1988
WO WO 95/34879 12/1995
WO WO 97/17664 5/1997
WO WO 97/40979 11/1997
WO WO 98/12383 3/1998
WO WO 99/31644 6/1999
WO WO 00/16978 3/2000
WO WO 0032412 6/2000
WO WO 00/46316 8/2000

OTHER PUBLICATIONS

U.S. Appl. No. 09/158,308, Weirather et al.
U.S. Appl. No. 09/158,728, Weirather et al.
U.S. Appl. No. 09/565,972, McCarthy et al.
U.S. Appl. No. 09/872,353, Weirather et al.
U.S. Appl. No. 10/366,005, McCarthy et al.
U.S. Appl. No. 10/991,320, McCarthy et al.

* cited by examiner

METHOD OF FORMING A PRINTABLE MEDIA SHEET CONSTRUCTION

CROSS-REFERENCE TO RELATED APPLICATIONS

This is a divisional of U.S. patent application Ser. No. 09/400,170, filed Sep. 21, 1999 now U.S. Pat. No. 6,837,955, which is a continuation-in-part of copending applications Ser. No. 09/158,728 filed Sep. 22, 1998 and Ser. No. 09/158,308 filed Sep. 22, 1998, and the entire contents of all of these applications are hereby incorporated by reference.

BACKGROUND OF THE INVENTION

The present invention relates to printable sheet constructions which are adapted to be fed into printers or copiers and indicia printed on different portions thereof and the portions thereafter separated into separate printed media, such as business cards. It further is concerned with methods for making those printing sheet constructions. Additionally, it relates to methods of using the sheet constructions to form the printed cards.

Small size media, such as business cards, ROLODEX-type card file cards, party invitations and visitors cards, because of their small format, cannot be fed into and easily printed using today's ink jet printers, laser printers, photocopiers and other ordinary printing and typing machines. Therefore, one known method of producing small size media has been to print the desired indicia on different portions of a large sheet such as 8½ by 11 or 8½ by 14 or A4 size sheets, and then to cut the sheets with some type of cutting machine into the different portions or individual small size sheets or media with the printing on each of them. However, this method is disadvantageous because the user must have access to such a cutting machine, and the separate cutting step is cost and time inefficient.

To avoid this cutting step, another prior art product has the portions of the sheet which define the perimeters of the media (e.g., the business cards) formed by preformed perforation lines. (See, e.g., PCT International Publication No. WO 97/40979.) However, a problem with this product was that since these cards must be durable and professional looking, they had to be made from relatively thick and heavy paper. And the thick, heavy perforated sheets are relatively inflexible, such that they cannot be fed from a stack of such sheets using automatic paper feeders into the printers and copiers. One proposed solution to this feeding problem is disclosed in U.S. Pat. No. 4,704,317 ('317) to Hickenbotham. (This patent and all other patents and other publications mentioned anywhere in this disclosure are hereby incorporated by reference in their entireties.) The method of the '317 patent reduces the stiffness of the corners of the sheet as by scoring, slitting, die cutting or calendering. However, a number of problems with this method prevented it from becoming generally commercially acceptable.

Another attempted solution to the sheet feeding problem is that disclosed in U.S. Pat. No. 5,571,587 ('587) to Bishop et al. (See also U.S. Pat. No. 4,447,481 to Holmberg et al.) Pursuant to the '587 patent the sheetstock has a relatively thin portion on at least one of the longitudinal edges thereof which facilitates feeding the sheetstock into a printer or copier. The thin portion is removed from the sheet after printing. The individual printed cards are then separated from one another by pulling or tearing along the preformed microperforated lines. While the perforation ties remaining along the edges of the printed cards thereby formed are small, they are perceptible, giving the card a less than professional appearance and feel.

A card sheet construction which uses clean cut edges instead of the less desirable perforated edges is commercially available from Max Seidel and from Promaxx/"Paper Direct", and an example of this product is shown in the drawings by FIGS. 1–3. (See Canadian Patent Publication No. 2,148,553 (MTL Modern Technologies Lizenz GmbH); see also German DE.42.40.825.A1.) Referring to these drawing figures, the prior art product is shown generally at 100. It includes a sheetstock 102, divided by widthwise and lengthwise cut lines 104 in columns and rows of cards 110, surrounded by a perimeter frame 112. On the back side 114 of the sheetstock 102, thin carrier element strips 116 made of polyester are glued with adhesive 118 along and over the widthwise cut lines. These strips 116 hold the cards 110 and the frame 112 together when the sheetstock 102 is fed into a printer or copier as shown generally at 120. After the sheetstock 100 has been fed into the printer or copier 120 and the desired indicia printed on the cards 110, the cards are peeled off of and away from the strips 116 and frame 112. After all of the cards 110 have been so removed from the sheetstock 102, the left-over material formed by the strips 116 and the frame 112 is discarded as waste material.

One of the problems with the prior art sheet product 100 is that printers have difficulty picking the sheets up, resulting in the sheets being misfed into the printers. In other words, it is difficult for the infeed rollers to pull the sheets past the separation tabs within the printers. Feeding difficulties are also caused by curl of the sheetstock 102 back onto itself. The "curl" causes the leading edge of the sheet to bend back and flex over the separation tabs. Since the sheetstock 102 is a relatively stiff product, it is difficult for the infeed rollers of the printer 120 to handle this problem.

Another problem with the prior art sheet 100 is a start-of-sheet, off-registration problem. In other words, the print is shifted up or down from its expected desired starting position below the top of the sheet. This off-registration problem is often related to the misfeeding problem discussed in the paragraph above. This is because if the printer is having difficulty picking up the sheet, the timing of the printer is effected. And this causes the print to begin at different places on the sheet, which is unacceptable to the users.

SUMMARY OF THE INVENTION

Directed to remedying the problems in and overcoming the disadvantages of the prior art, disclosed herein is a dry laminated sheet construction including printable media, such as business cards, ROLODEX type cards, party invitations, visitor cards or the like. A first step in the formation of this dry laminated sheet construction is to extrusion coat a low density polyethylene (LPDE) layer on a densified bleached kraft paper liner, thereby forming a film-coated liner sheet. Using a layer of hot melt adhesive, a facestock sheet is adhered to the film side of the liner sheet to form a laminated sheet construction web. A more generic description of the "dry peel" materials—the LPDE, and densified bleached kraft paper liner—is a film forming polymer coated onto a liner stock. The facestock sheet, the film layer and the adhesive layer together define a laminate facestock. (See U.S. Pat. No. 4,863,772 (Cross); see also U.S. Pat. No. 3,420,364 (Kennedy), U.S. Pat. No. 3,769,147 (Kamendat et al), U.S. Pat. No. 4,004,058 (Buros et al), U.S. Pat. No. 4,020,204 (Taylor et al), and U.S. Pat. No. 4,405,401 (Stahl)). The sheet construction (which also includes a facestock bonded to the film forming polymer) separates at the film-liner interface rather than the facestock-film interface, when the final construction is subjected to a peeling force.

According to one embodiment of this invention, a web of laminate facestock is calendered along one or both edges thereof to assist in subsequent printer feed of the printable media sheets. The calendered edges help prevent the multiple sheet feed-through, misfeed and registration problems of the prior art. Lines are die cut through the laminate facestock and to but not through the liner sheet. These facestock cut lines define the perimeters of blank business cards (or other printable media) and a surrounding waste paper frame. These die cut lines do not cause sheets to get caught in one another. This allows sheets to be effectively fed into printers. Lines are then cut through the liner sheet, but not through the laminate facestock, to form liner sheet strips on the back face of the laminate facestock. The liner sheet cut lines can each be straight lines or they can be curving, wavy lines. The lines can be horizontally (or vertically) straight across the sheet or diagonally positioned thereon. According to one alternative, the lines can extend only part way across the sheet, such as from both side edges, to only a central zone of the sheet. Further steps in the process are to sheet the web into individual sheets, stack and package them and distribute the packaged sheets through retail channels to end users.

The laminated (business card) sheets are unpackaged by the user and stacked into the feed tray of a printer or copier and individually and automatically fed, calendered edge first into a printer (and particularly a horizontal feed ink jet printer) or copier where indicia is printed on each of the printable media (or blank business cards) on the sheet. After the printing operation, each of the printed media (or business cards) is peeled off of the liner sheet strips and out from the waste paper frame. The support structure formed by the strips and the frame is subsequently discarded. Alternatively, the support structure is peeled off of the printed business cards. The product, in either event, is a stack of cleanly printed business cards, each having clean die cut edges about its entire perimeter.

In other words, the adhesive layer securely bonds the facestock sheet to the LPDE film layer on the liner sheet. It bonds it such that the overall sheet construction separates or delaminates at the film-liner sheet interface, when the user peels the printed business cards and liner strips apart. That is, it does not separate at the facestock sheet interface. Additionally, the film-coated liner sheet does not significantly affect the flexibility of the sheet as it is fed through the printer. Rather, it is the thickness of the facestock which is the more significant factor. Thus, the facestock sheet needs to be carefully selected so as to not be so stiff that feeding or printing registration problems result.

Pursuant to some of the preferred embodiments of the invention, every other one of the strips is peeled off and removed from the sheet during the manufacturing process and before the sheet is fed into a printer or copier. The remaining strips cover a substantial number of the laminated facestock cut lines and extend onto the waste paper frame to hold the business card blanks and the sheet together as they are fed into and passed through the printer or copier. The remaining strips (and thus the facestock cut lines) preferably extend width-wise on the sheet or are perpendicular to the feed direction of the sheet to make the laminated sheet construction less stiff and more flexible as it passes into and through the printer or copier. By starting off with a single continuous liner sheet to form the strips, the final stripped product is flatter than the prior art products. Thus, it is less likely that the sheets will bow and snag together.

Other embodiments do not remove any of the strips before the sheet is fed into the printer or copier. In other words, the entire back side of the laminated facestock is covered by the liner sheet having a series of liner-sheet cut lines.

A further definition of the method of making this invention includes forming a roll of a web of dry laminate sheet construction comprising a liner sheet on a facestock sheet. The web is unwound under constant tension from the web and the edges of the web are calendered. The facestock sheet of the unwound web is die cut without cutting the liner sheet to form perimeter outlines of the printable media (business cards). The liner sheet is then die cut, without cutting the facestock sheet, to form liner strips. Alternating ones of the interconnected liner strips are removed as a waste liner matrix and rolled onto a roll and disposed of. The web is then sheeted into eleven by eight-and-a-half inch sheets, for example, or eight-and-a-half by fourteen or in A4 dimensions; the sheets are stacked, and the stacked sheets are packaged. The user subsequently removes the stack of sheets from the packaging and positions the stack or a portion thereof in an infeed tray of a printer or copier for a printing operation on the printable media or individually feeds them into the printer or copier. After the printing operation, the printed media are separated from the rest of the sheet, as previously described.

Sheet constructions of this invention appear to work on the following ink jet printers: HP550C, HP660C, HP722C, HP870Cse, Canon BJC620, Canon BJC4100, Epson Stylus Color II and Epson Stylus Color 600.

Another advantage of the embodiments of the present invention wherein alternate strips of the liner are removed before the printing operation is that a memory curl is less likely to be imparted or induced in the business cards from the liner sheet. Memory curl occurs when the facestock is removed from a full liner sheet. The liner strips are better than liner sheets since they reduce the amount of memory curl that occurs during removal of the facestock.

A further embodiment of this invention has a strip of the laminated facestock stripped away at one end of the sheet to leave a strip of the liner sheet extending out beyond the end of laminated facestock. This liner strip defines a thin infeed edge especially well suited for feeding the sheets into vertical feed printers and appears to work better than calendering the infeed edge. The opposite (end) edge of the laminated facestock can also be stripped away to leave an exposed liner sheet strip. Alternatively, the opposite edge of the laminated facestock can be calendered. The calendered edge appears to work better for feeding the sheets into horizontal feed printers. And instructions can be printed on the sheet (or on the packaging or on a packaging insert) instructing the user to orient the sheet so that the exposed liner strip defines the infeed end when a vertical feed printer is used and to orient the sheet so that the calendered edge defines the infeed end when a horizontal feed printer is used.

In fact, this inventive concept of the exposed liner strip at one end and the calendered edge at the other end can be used for other sheet constructions adapted for feeding into printers for a printing operation thereon. An example thereof is simply a face sheet adhered to a backing sheet. The backing sheet does not need to have cut lines or otherwise formed as strips. And the face sheet does not need to have cut lines; it can, for example, have perforated lines forming the perimeters of the business cards or other printable media.

A preferred sheet construction of the present invention is facially similar to but a significant improvement over the prior art "Paper Direct" product shown in FIGS. 1–3, and described in the Background of the Invention portion of this disclosure. In addition to the previously-discussed problems, that prior art product is too flimsy. Accordingly, a preferred sheet construction of the present invention uses paper strips, instead of polyester film strips, to hold the sheet together. The paper strips are stiffer and preferably wider (e.g., 9/16 inch wide) than the film strips, thereby giving the sheet construction a firmer, more intact, feel, which is commercially valuable. Additionally, the paper strips allow the sheet to lay flat, with less puckering along the die cut unions, since it reacts to the environment in a similar manner as the cardstock.

Similar to the dry laminate products of this invention described above a laminate cardstock is formed according to this preferred embodiment. Ultraremovable adhesive is applied to a paper sheet to form therewith a liner sheet and the liner sheet is laminated to a cardstock (facestock) sheet to form this laminate cardstock web. The web is face die cut through the cardstock sheet but not through the liner sheet to thereby form cardstock cut lines that define at least in part perimeters of the printable media (business cards, postcards, greeting cards, and so forth). At the next station the web is then die cut through the liner sheet, but not through the cardstock sheet, to form liner sheet strips on a back side of the cardstock sheet. Some of the strips define cover strips covering backs of some of the cardstock cut lines, and others of the strips define waste strips. The waste strips are then matrix removed from the back of the cardstock sheet. The web is then sheeted into sheets of the desired size, such as 8½ by 11 inches. The sheets are ready to be fed into a printer or copier, and a printing operation thereby conducted on fronts of the printable media. The printed media are then separated from (peeled off of) the cover strips, ready for use. The cover strips preferably provide the sole means of keeping the die cut printable media together as an intact unit sheet for passing through the printer or copier. Removing the waste strips before the sheet is passed through the printer or copier makes the sheet more flexible so that it can bend and pass better through the winding paths in the printers or copiers.

The ultraremovable adhesive is peeled off with the paper waste strips and the cover strips thereby providing a clean back side to the cardstock sheet (and thereby the printed media). The clean back side(s) (even when a coating thereon is provided) advantageously can be written on, that is, it accepts pencil, ink and even inkjet and laser printing. The ultraremovable adhesive sticks to the paper allowing for easy removal and disposal of the paper strips, and even though it is tacky it does not stick to anything permanently. In contrast, the "Paper Direct" product uses a removable adhesive. (Generally, adhesions of "ultraremovable" adhesives at their highest adhesion levels (to a surface such as stainless steel) are roughly half of what they are for conventional "removable" adhesive. A fundamental difference is that conventional adhesives provide complete contact with a substrate while ultraremovable provide partial contact. This limited contact area is what prevents an ultraremovable adhesive from becoming permanent, over time.)

To assist the sheet in being fed into the printer or copier the lead-in edge thereof is preferably calendered, unlike the "Paper Direct" product. The web, before sheeting, is preferably calendered with textured calendering dies before the face cutting station. The calendering step is also preferably performed after the printing operation on the web wherein identifying and explanatory information is printed on the cardstock.

Other objects and advantages of the present invention will become more apparent to those persons having ordinary skill in the art to which the present invention pertains from the foregoing description taken in conjunction with the accompanying drawings.

DETAILED DESCRIPTION OF PREFERRED EMBODIMENTS OF THE INVENTION

Figure 1:
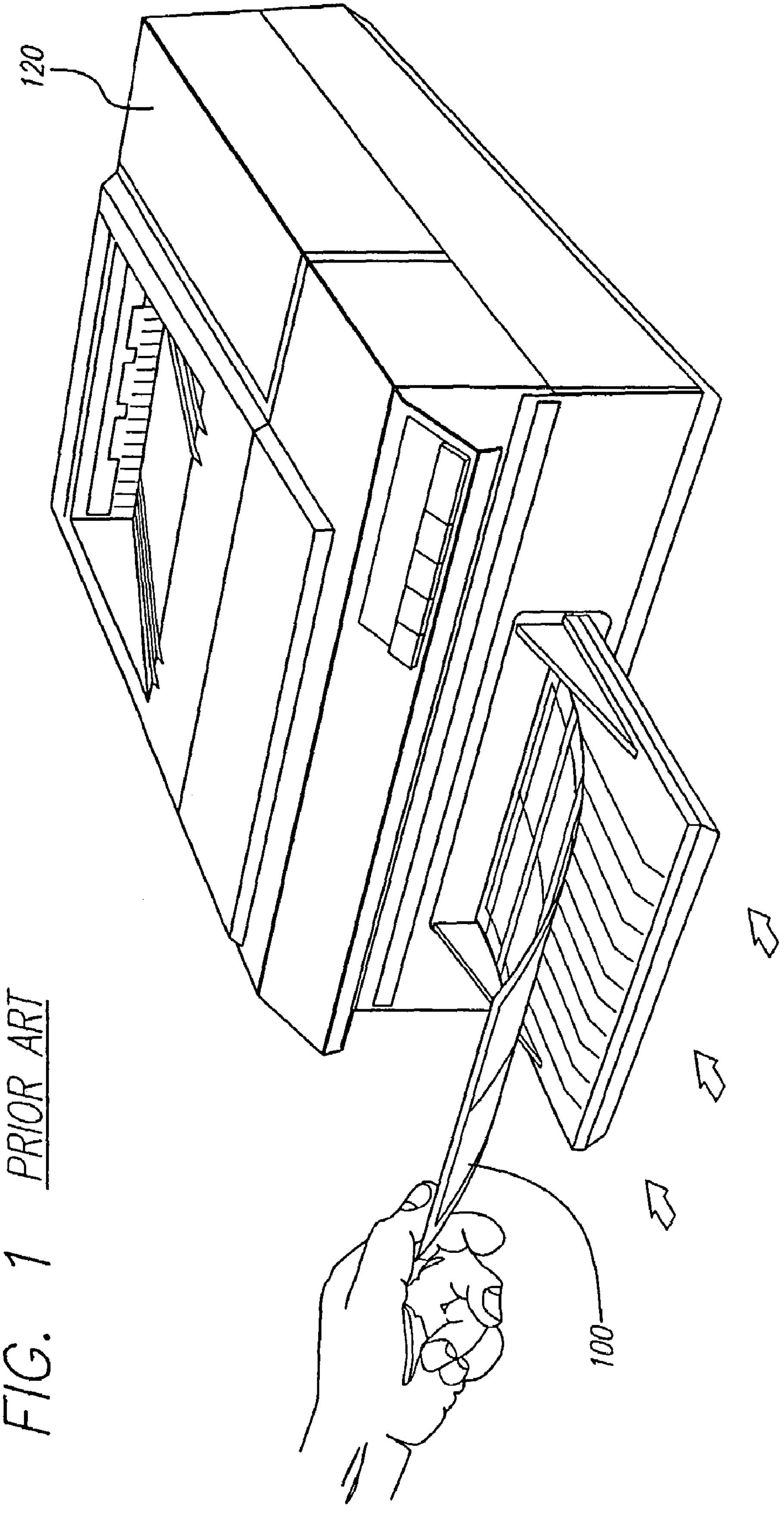
FIG. 1 PRIOR ART
FIG. 1 is a perspective view showing a prior art sheet construction being fed into a printer or copier.
Figure 2:
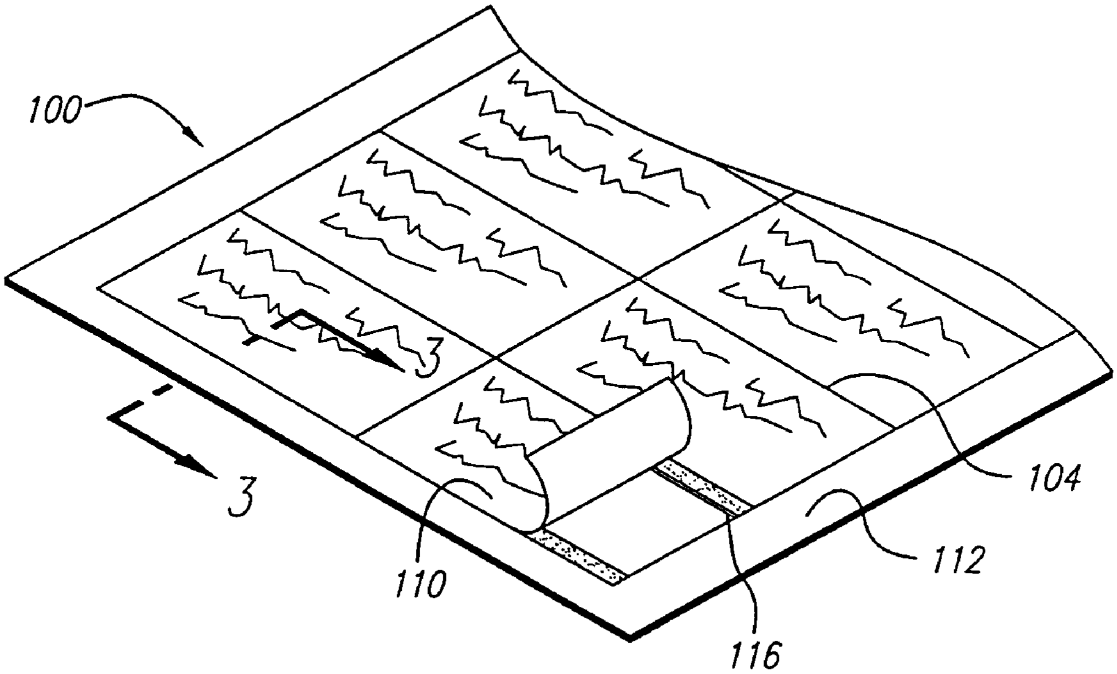
FIG. 2 PRIOR ART
FIG. 2 is a perspective view of an end of the prior art sheet construction of FIG. 1 showing a sheet portion or card being removed therefrom.
Figure 3:
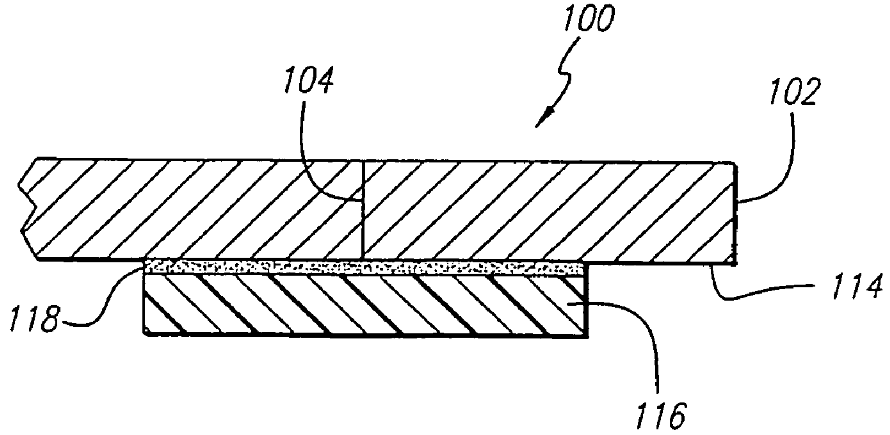
FIG. 3 PRIOR ART
FIG. 3 is an enlarged cross-sectional view taken on line 3—3 of FIG. 2.

A number of different embodiments and manufacturing processes of the dry laminated business card sheet constructions of this invention are illustrated in the drawings and described in detail herein. A representative or first sheet construction is illustrated generally at 200 in FIGS. 5, 6 and 7, for example.

Figure 4:
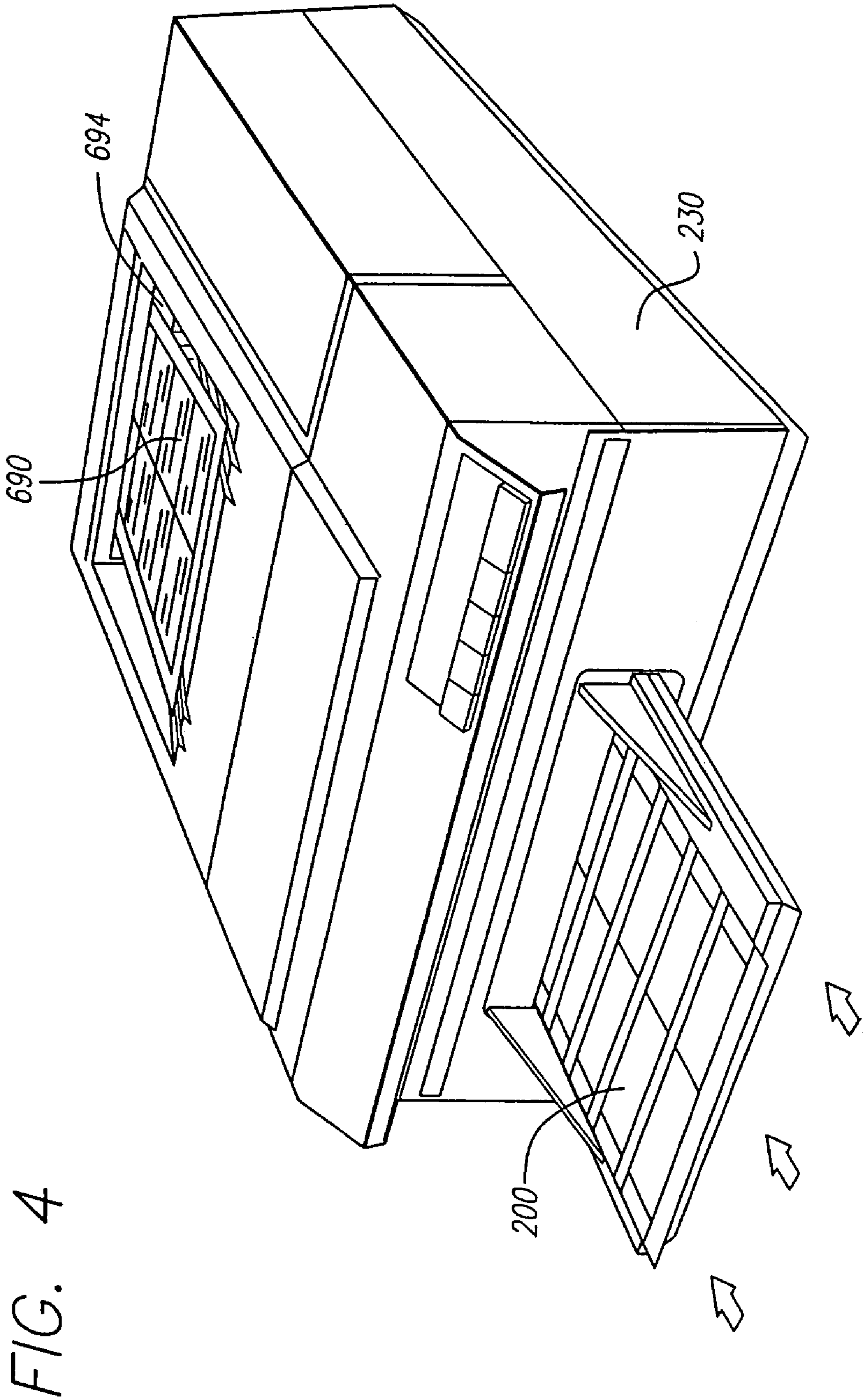
FIG. 4 is a perspective view showing a laminated sheet construction of the present invention being fed into a printer or copier and a laminated sheet construction of the present invention after a printing operation has been performed thereon by the printer or copier.

Referring to FIG. 4, sheet construction 200 is formed by extrusion coating a low density polyethylene (LDPE) layer 204 onto a densified bleached kraft paper liner sheet (or base paper or base material) 208, which is not siliconized. The thin extrusion-cast LDPE layer 204 is unoriented. A suitable liner sheet 208 with layer 204 is available from Schoeller Technical Papers of Pulaski, N.Y. The extrusion-coated liner sheet is laminated to a facestock sheet (or card stock) 212 using a layer of hot melt pressure sensitive adhesive (PSA) 216. The facestock sheet 212, the adhesive layer 216 and the film 204 form a laminate facestock 220. The facestock sheet 212 can be current ink jet business card stock available from the Monadnock paper mills and which has good printability and whiteness. The adhesive of layer 216 can be a conventional hot melt adhesive such as H2187-01 hot melt adhesive available from Ato Findlay, Inc. of Wauwatusa, Wis., or hot melt rubber-resin adhesive compositions of the type taught in U.S. Pat. No. 3,239,478 (Harlan, Jr.). The requirements for the hot melt PSA are not very demanding. The PSA layer 216 need only secure the facestock sheet 212 to the LDPE layer 204 of the dry release base material or liner sheet 208, such that the overall dry laminate facestock construction 224 delaminates at the LDPE-liner sheet interface when a user seeks to peel away the liner, and not at a surface of the facestock sheet 212.

A preferred example of this dry laminate facestock construction 224 is the "Dry Tag" product such as manufactured at the Fasson Roll Division of Avery Dennison Corporation. The facestock sheet 212 can alternatively be fluorescent paper, high gloss paper or thermal transfer label paper. A preferred high photo glossy paper which can be used is the glossy cardstock which is available from Rexam Graphics of Portland, Oreg. and has a thickness of approximately eight mil.

Figure 6:
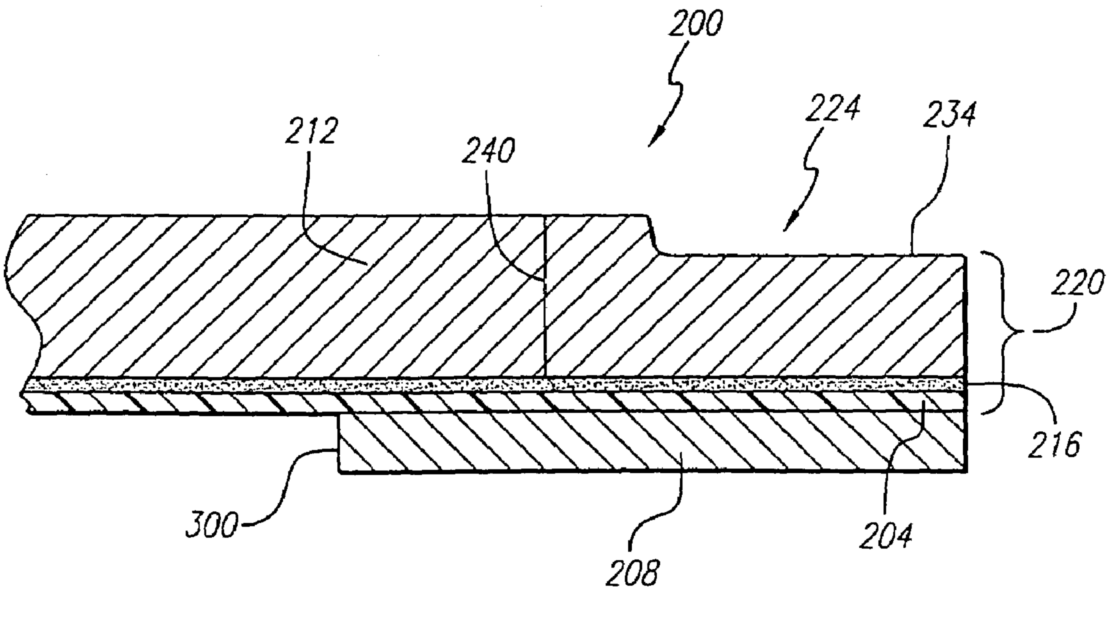
FIG. 6 is an enlarged cross-sectional view taken on line 6—6 of FIG. 5.

Preferred thicknesses of each of the layers of the laminate facestock construction 224 are as follows: the liner sheet 208—3.0 mil; the LDPE film layer 204—0.80 to 1.0 mil; the adhesive layer 216—0.60 to 0.75 mil; and the facestock sheet 212—8.3 or 8.5 to 9.0 mil. Alternatively, the liner sheet 208 plus the film layer 204 can have a 3.5 mil thickness. Another alternative is for the thicknesses of the facestock sheet 212 and the liner sheet 208 to be approximately 6.0 and 3.0 mil, respectively, or approximately 7.0 and 2.0 mil, respectively. The LDPE layer 204 will not significantly affect the flexibility of the sheet construction; rather, it is the thickness of the facestock 212 which is the more significant factor. To assist the picking up and feeding of the laminate facestock construction 224 into the printer or copier 230, the leading edge 234 can be, according to one definition of this invention, calendered or crushed, as shown in FIG. 6. More particularly, a 7/16 inch wide portion of the leading edge 234 can be crushed with a calendering die to reduce the caliper from thirteen mil to ten mil, for example.

Figure 8:
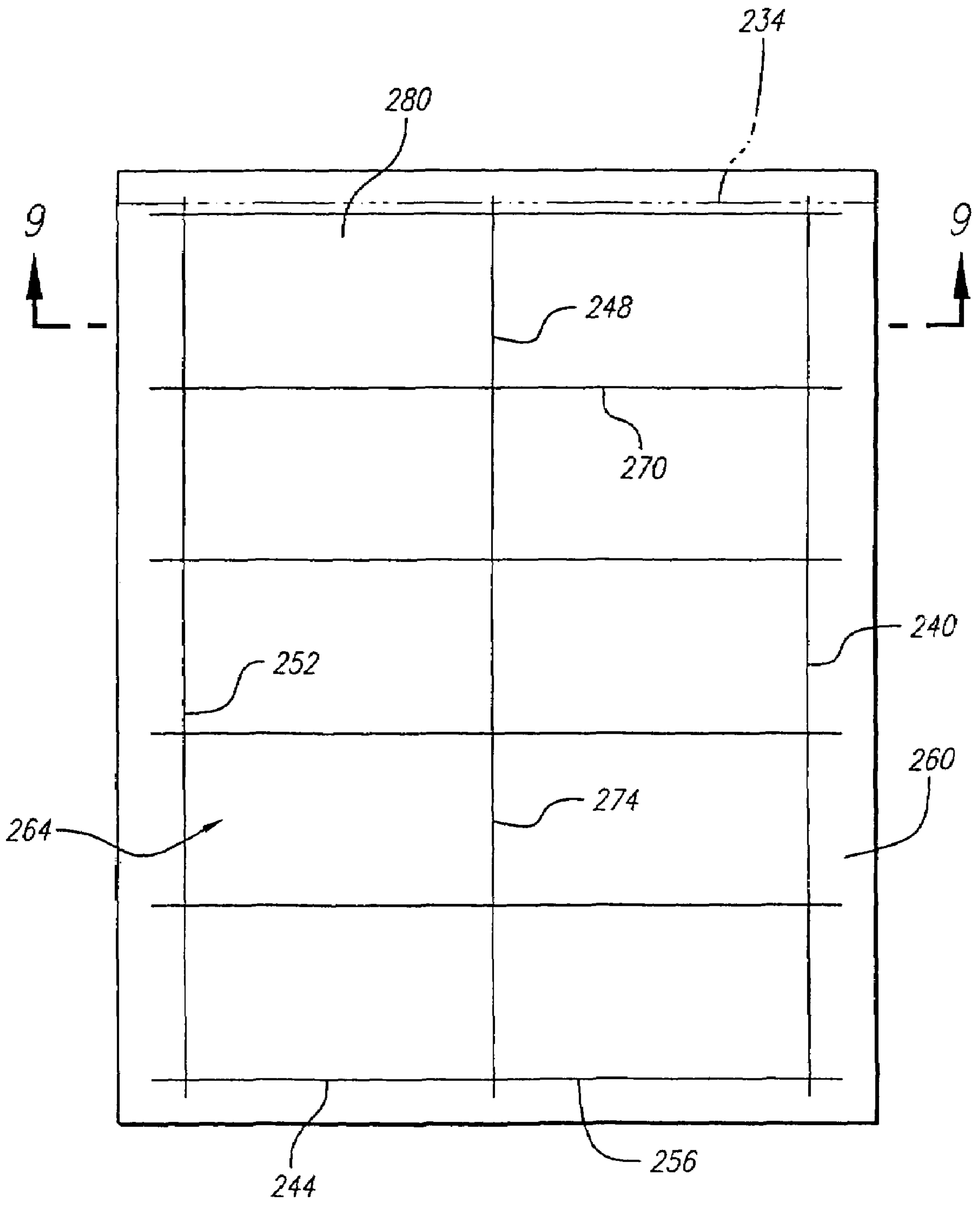
FIG. 8 is a plan view of the front of the first laminated sheet construction of FIG. 7.
Figure 11:
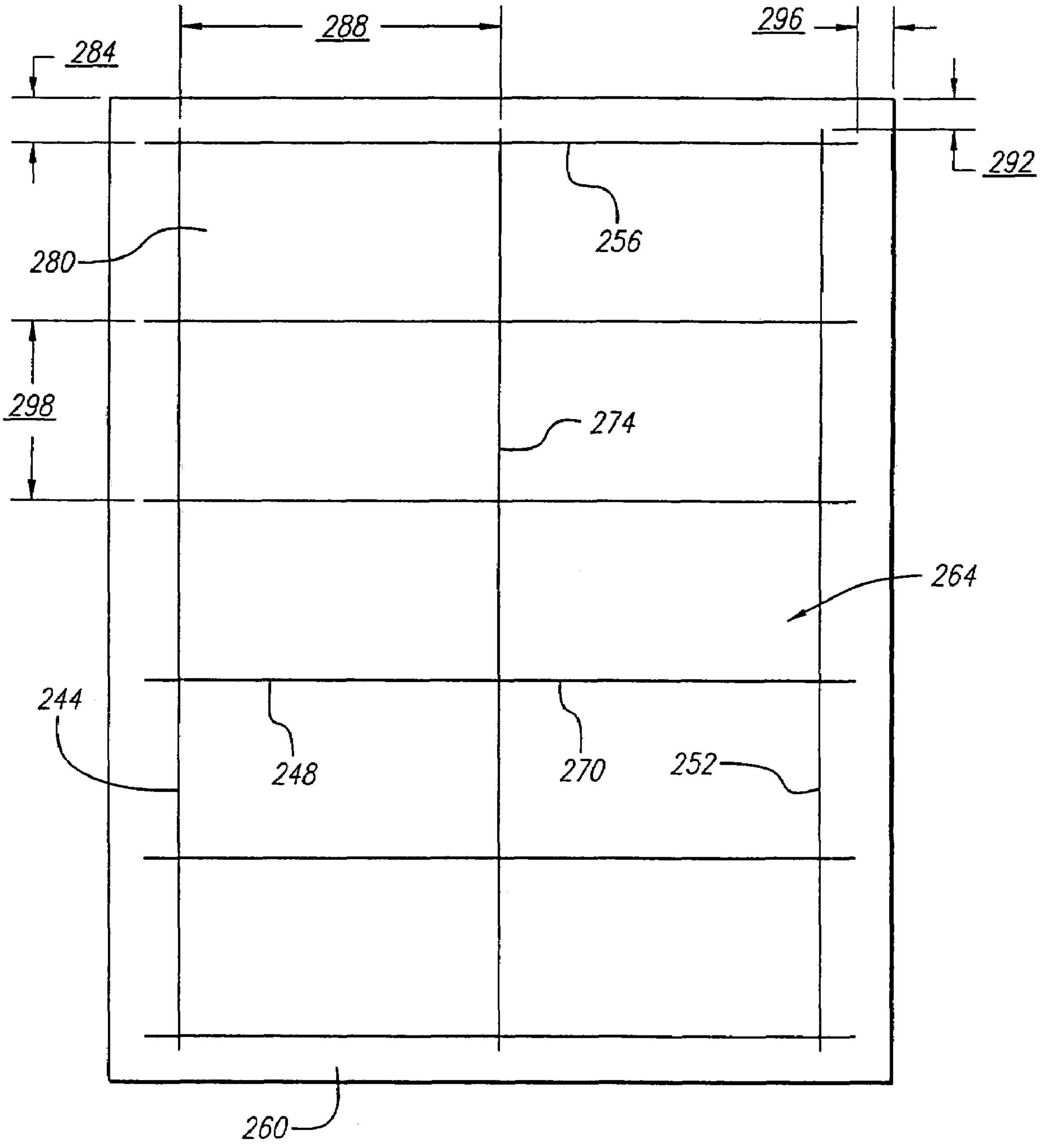
FIG. 11 is a view similar to FIG. 8.

In addition to calendering the leading edge 234 of the laminate facestock construction 224, further processing steps are needed to form the sheet construction 200. One key step is to form cut lines 240 on and through the laminate facestock. Referring to FIGS. 8 and 11, the cut lines 240 include frame cut lines 244 and grid cut lines 248, and the frame cut lines include side cut lines 252 and end cut lines 256. The frame cut lines 244 define a border or frame 260 around the central area 264 of the sheet. And the grid cut lines 240 form a grid of spaced horizontal and vertical cut lines 270, 274 in the central area 264. Thereby, the grid cut lines 248 and the frame cut lines 244 form the perimeters of rectangular media 280, such as business cards. FIG. 8 shows that a preferred number of the rectangular media 280 is ten, aligned in two columns of five each and surrounded by the frame 260. FIG. 11 shows that preferred dimensions 284, 288, 292, 296 and 298 are ½, 3½, 11/32, ⅜ and 2 inches, respectively.

The facestock cut lines 240 extend through the laminate facestock construction 224 and to but not through the liner sheet 208. If the facestock cut lines 240 passed through the liner sheet 208, the laminate facestock construction 224 would fall apart into the rectangular media 280 and the frame 260, each separate from the other. The separate small media cannot be passed effectively through the printer or copier 230 for a printing operation on them. Instead, the facestock cut lines 240 do not pass through the liner sheet 208. However, the continuous liner sheet 208, while it would hold the (ten) rectangular media 280 and the frame 260 together during the printing operation, may make the sheet construction 200 too rigid, lacking the flexibility to pass through the curving feed paths in printers or copiers. In some of the figures which show the back or liner face of the sheet construction, the facestock cut lines 240 are shown in dotted lines to depict their relationship with the liner sheet strips as discussed below. Although the facestock cut lines 240 and the liner-sheet cut lines discussed below are preferably formed by die cutting, other techniques such as laser cutting or using a circular cutting blade as would be known by those skilled in the art are within the scope of this invention.

Therefore, pursuant to the present invention, liner-sheet cut lines 300 are formed on the liner sheet 208, through the liner sheet and to but not through the laminate facestock 224. They divide the liner sheet 208 into liner strips 304. The liner-sheet cut lines 300 provide flexibility to the sheet construction 200 and according to some of the embodiments of this invention, adequate flexibility. However, for others the flexibility is not enough, so these embodiments provide that some of the strips are removed from the laminate facestock 224 to form the sheet construction which is passed through the printer or copier 230. More importantly, by removing some of the liner strips, the amount of memory curl induced in the (printed) media is reduced. The remaining strips 308, however, must be sufficient to hold the cut laminate facestock 224 together during the printing operation. In other words, the shape and location of the remaining strips 308 are selected on the one hand to provide sufficient sheet flexibility and to minimize memory curl and on the other hand to provide sufficient sheet integrity. In particular, according to preferred embodiments, the remaining strips cover all of the facestock cut lines 240 which are parallel to the infeed edge of the sheet. Where the sheet is to be fed in the portrait direction into the printer or copier 230, the covered facestock cut lines extend width-wise on the sheets.

Figure 13:
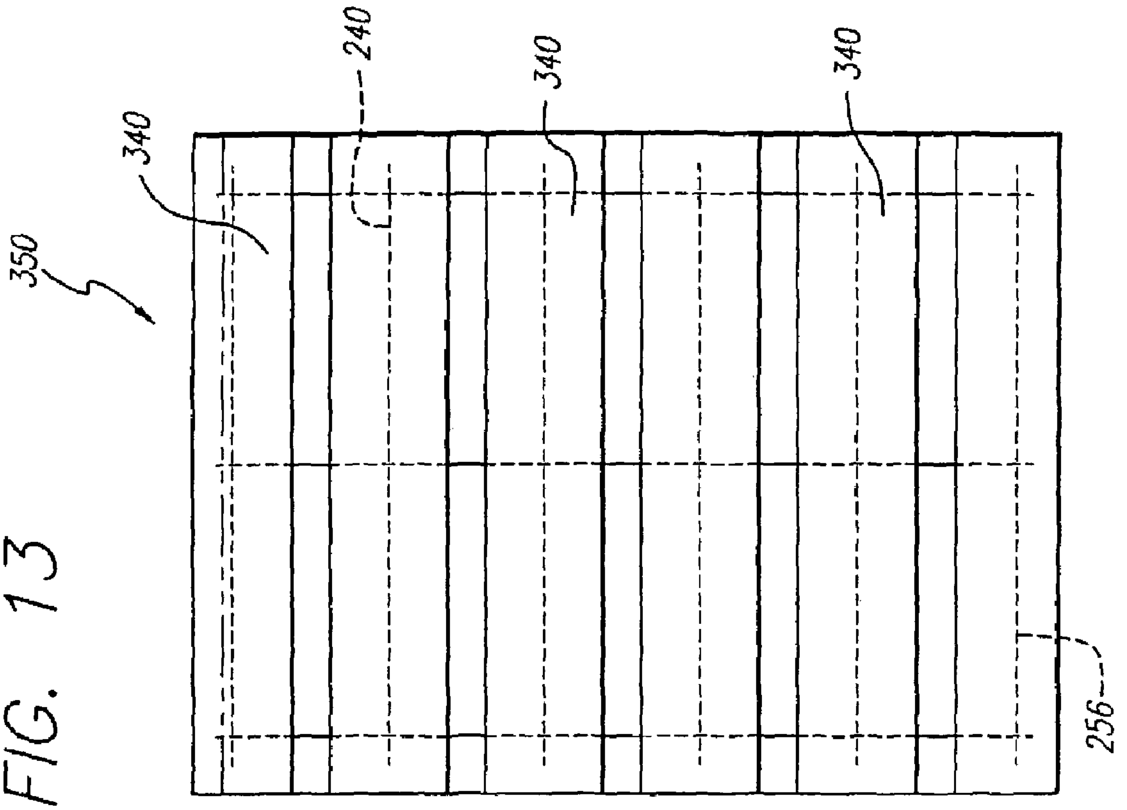
FIG. 13 is a view similar to FIG. 7 but of a second laminated sheet construction of the present invention.
Figure 7:
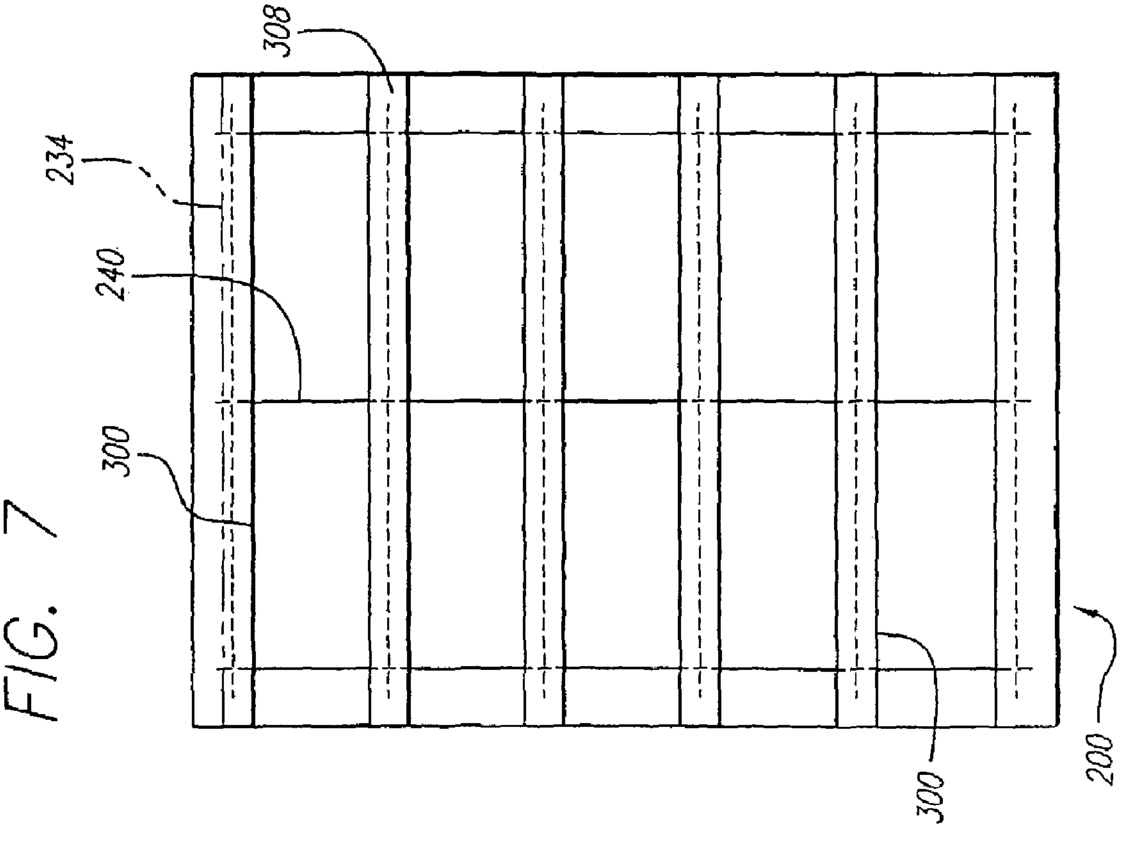
FIG. 7 is a plan view of the back of the first laminated sheet construction of FIG. 5.
Figure 10:
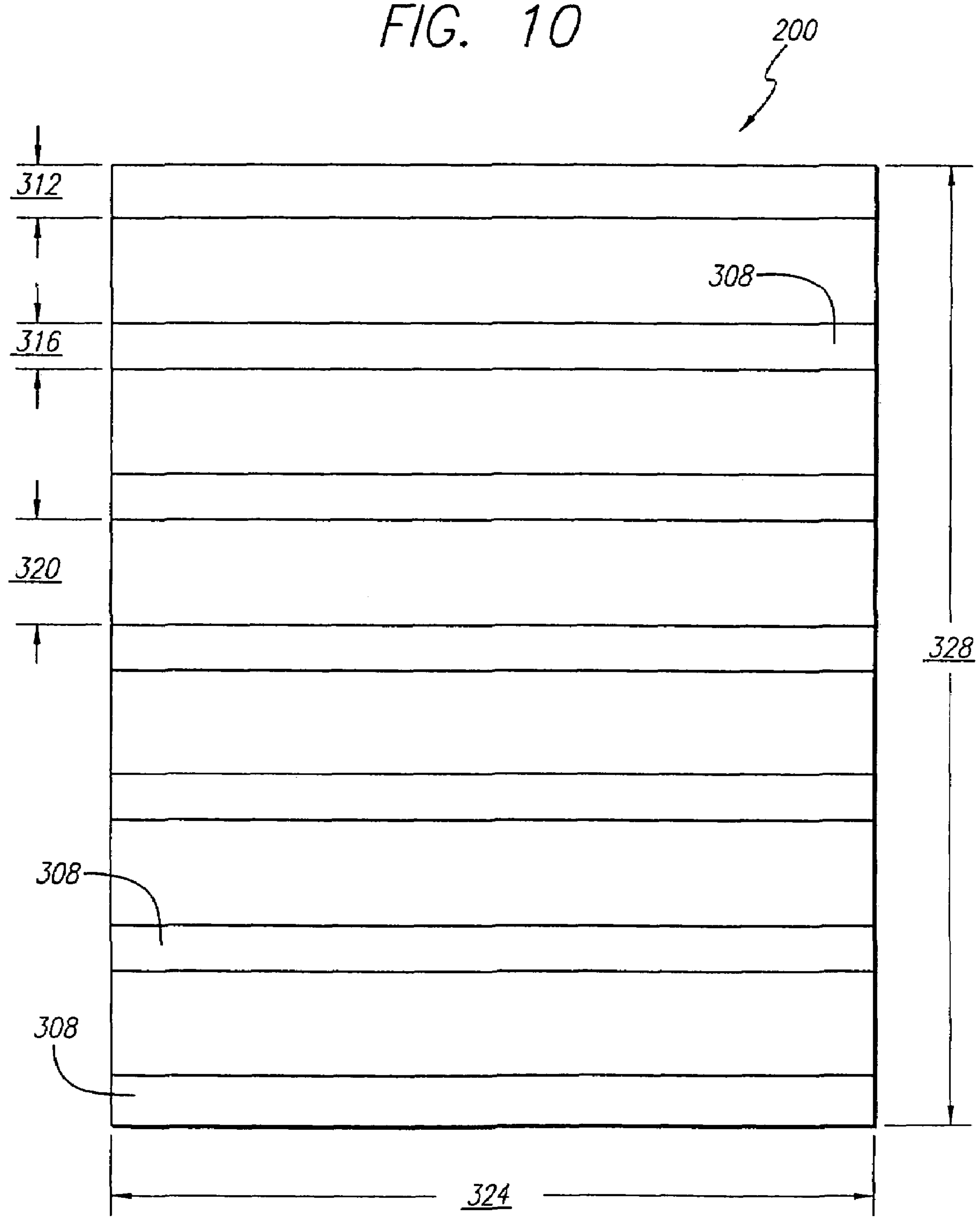
FIG. 10 is a view similar to FIG. 7.
Figure 14:
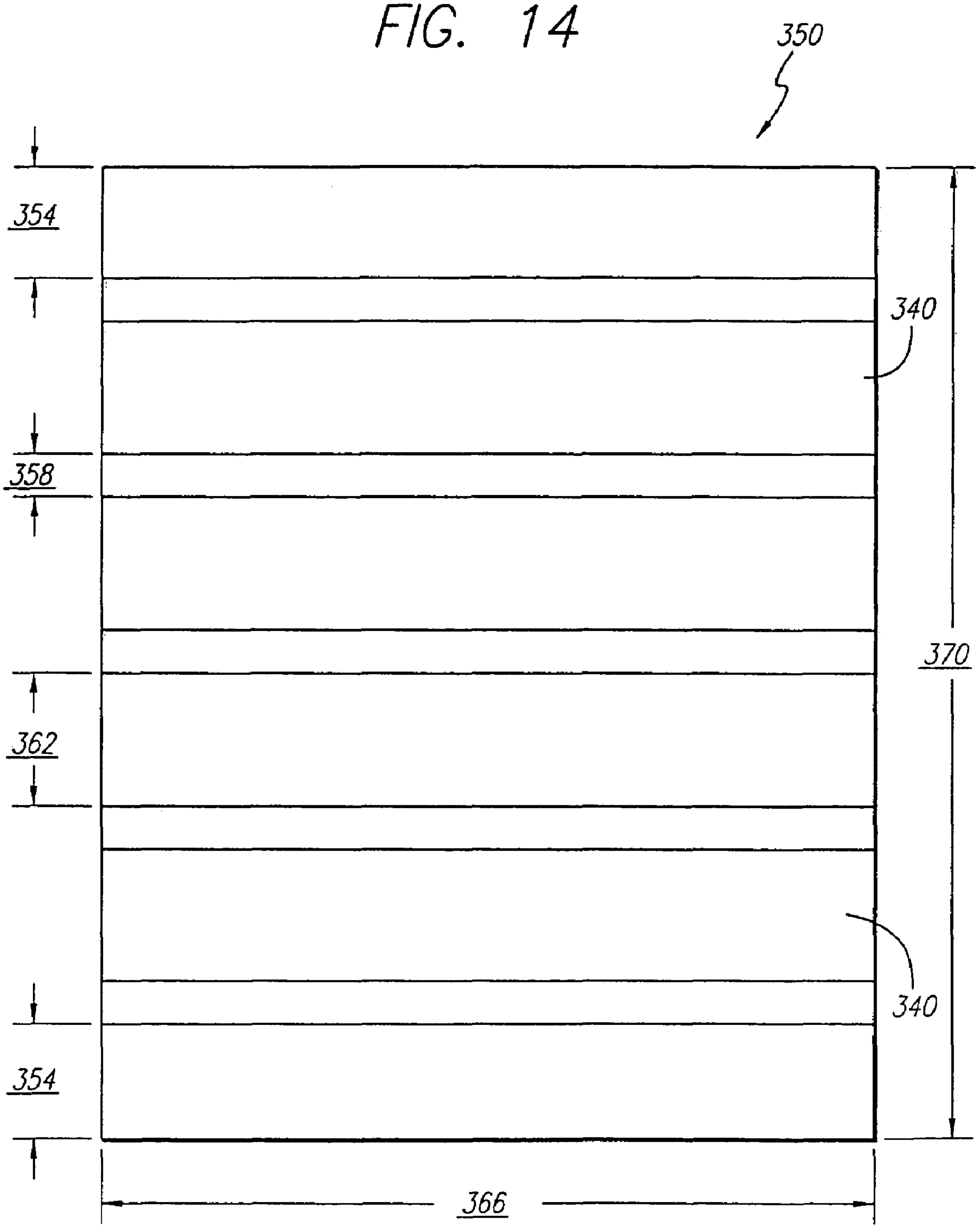
FIG. 14 is a view similar to FIG. 13.

The embodiment of FIG. 7 shows the remaining strips 308, 340 being relatively thin, but still covering and overlapping the horizontal facestock cut lines. FIG. 10 gives the dimensions of the sheet construction 200 and the remaining strips 308. Dimensions 312, 316, 320, 324 and 328 are ⅞, ¾, 1¼, 8½ and 11.00 inches, respectively. In contrast, the remaining strips 340 in the sheet construction as shown generally at 350 in FIG. 13 are wider. The dimensions of the strips and sheet are shown in FIG. 14 by dimensions 354, 358, 362, 366 and 370, as being 1¼, ½, 1½, 8½ and 11.00 inches, respectively.

Figure 9:
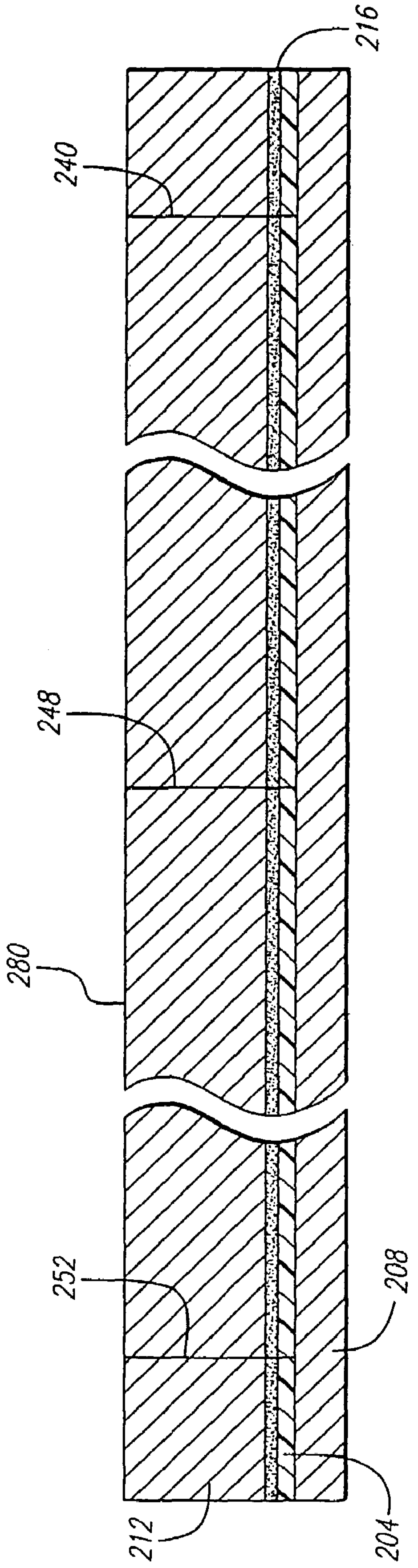
FIG. 9 is an enlarged cross-sectional view taken on line 9—9 of FIG. 8.
Figure 9A:
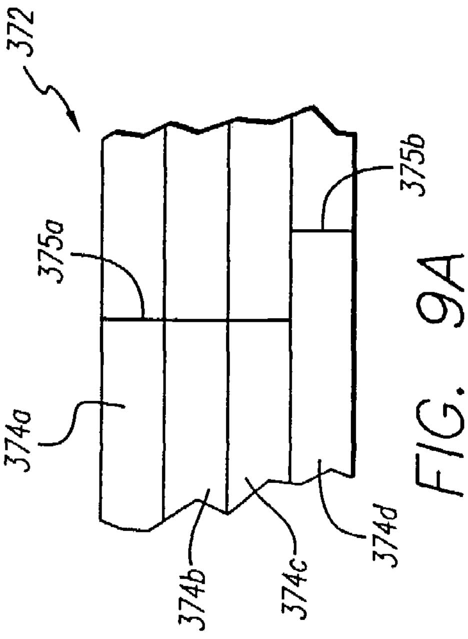
FIG. 9A is a view similar to FIG. 9 and illustrates a portion of a first alternative construction.
Figure 9B:
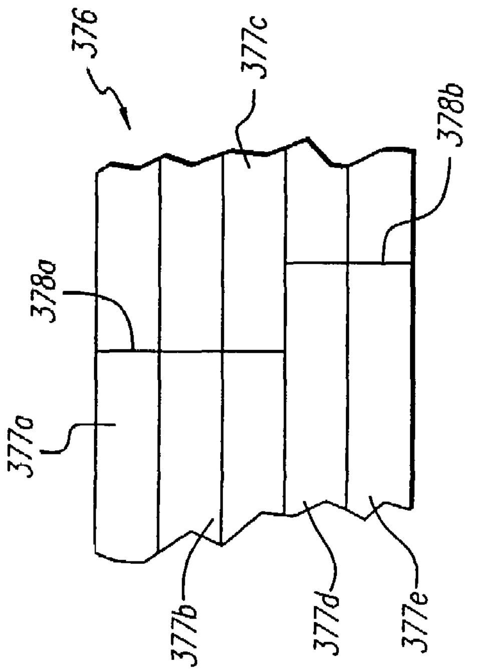
FIG. 9B illustrates a portion of a second alternative construction.

FIGS. 9A and 9B are enlarged cross-sectional views of first and second alternative sheet constructions of this invention. They are alternatives to the LDPE/densified bleached kraft paper component of FIG. 9, for example. The relative thicknesses of the layers are not represented in these drawings. Alternative construction shown generally at 372 in FIG. 9A uses vinyl or another cast film on its casting sheet. Referring to FIG. 9A, the tag facestock or other paper sheet is shown by reference numeral 374*a*. The PSA layer, vinyl or cast film, and the casting sheet are labeled with reference numerals, 374*b*, 374*c* and 374*d*, respectively. Reference numerals 375*a* and 375*b* depict the facestock cut lines and liner cut lines. Similarly, the second alternative shown generally at 376 in FIG. 9B includes tag facestock or other face paper 377*a*, PSA layer 377*b*, film #1 377*c*, film #2 377*d* and liner 377*e*. The facestock and die cutlines are shown by reference numerals 378*a* and 378*b*, respectively.

Figure 15:
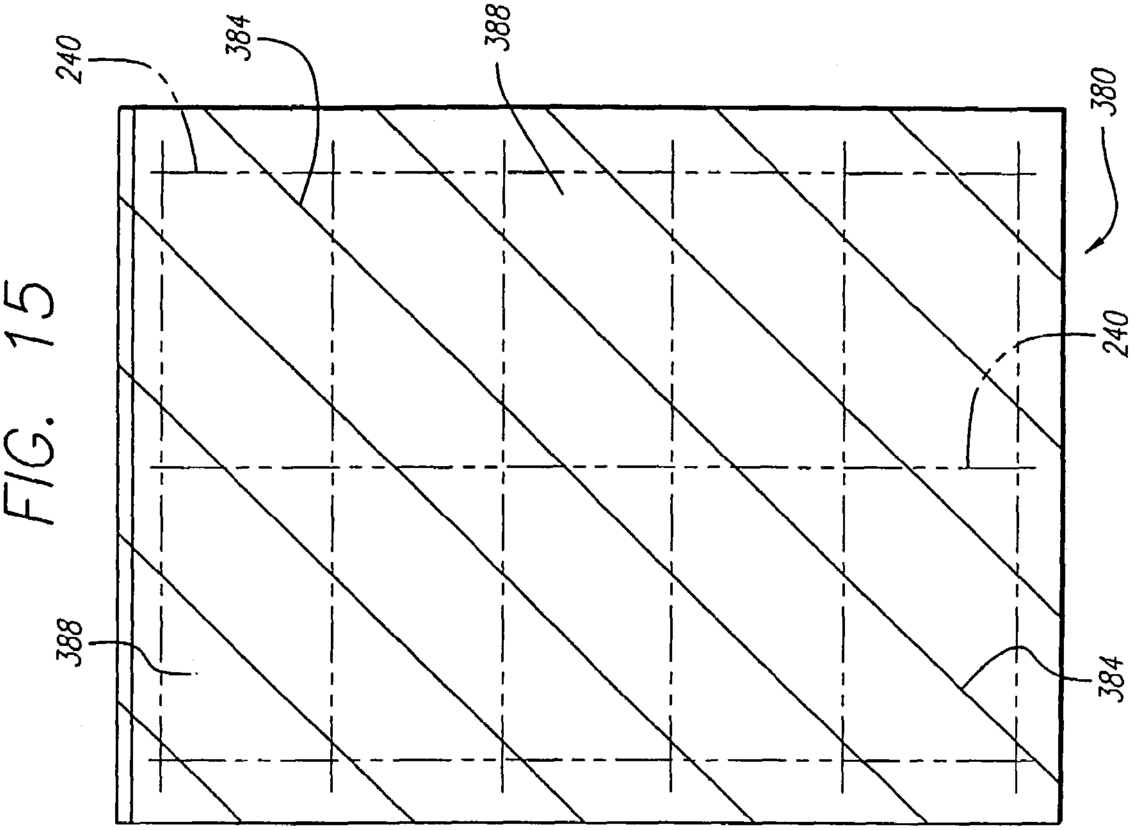
FIG. 15 is a back view of a third laminated sheet construction of the present invention.
Figure 16:
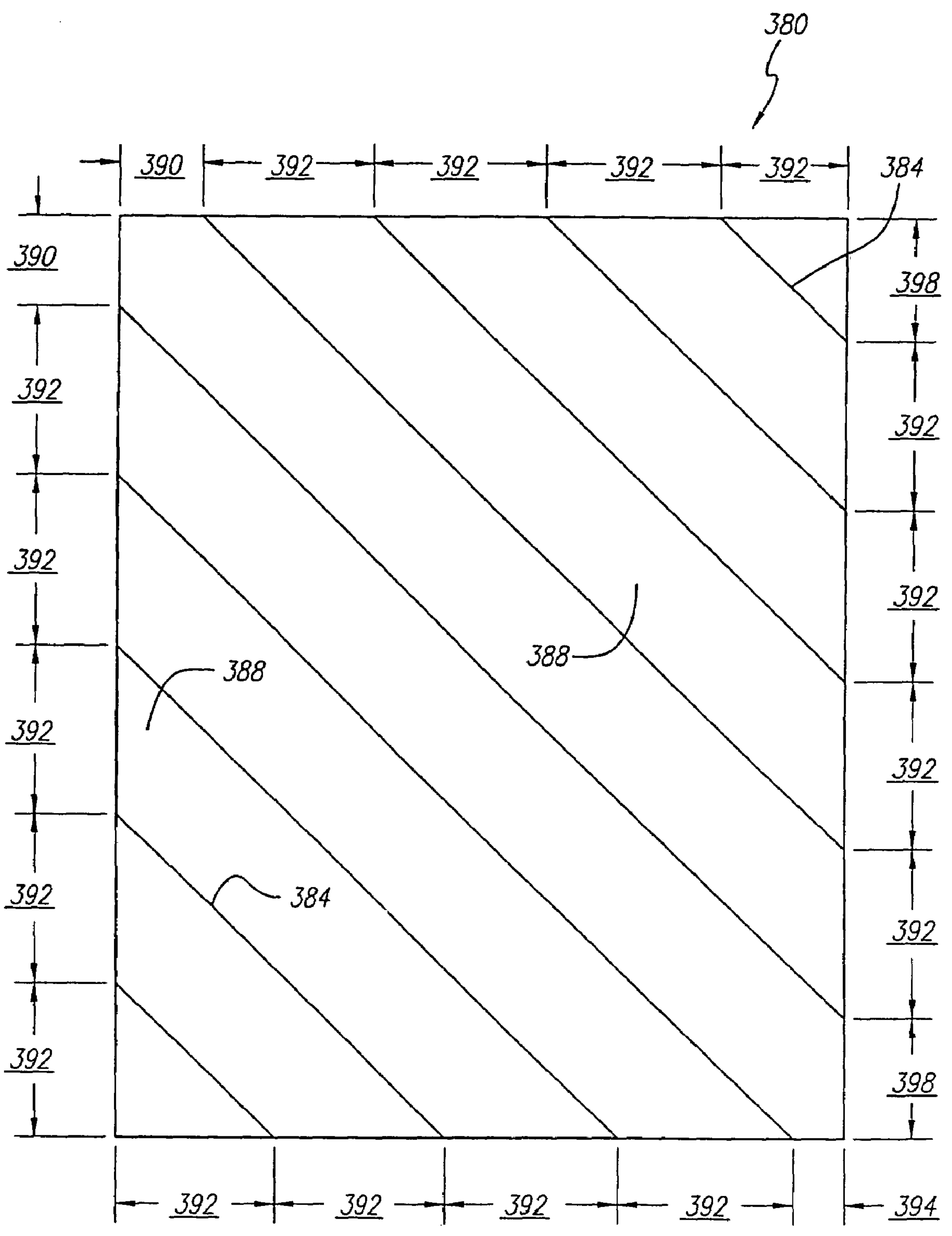
FIG. 16 is a view similar to FIG. 15.

While sheet constructions 200, 350 show the liner-sheet cut lines and thus strips 308, 340 extending straight across the sheet, sheet construction 380 has its liner-sheet cut lines 384 extending diagonally across the back of the laminate facestock. This construction is shown in FIG. 15, and FIG. 16 shows dimensions 390, 392, 394 and 398, which can be 1, 2, ½, and 1½ inches, respectively. Sheet construction 380 includes all of the diagonal liner strips 388 still positioned on the laminate facestock during a printing operation. However, it is also within the scope of the invention to remove (unpeel) one or more of the strips before the printing operation. One arrangement would remove alternating ones of the diagonal strips. However, it may be that the remaining (diagonal) strips do not provide the sheet with sufficient integrity to prevent bowing of the sheet on the facestock cut lines.

Figure 17:
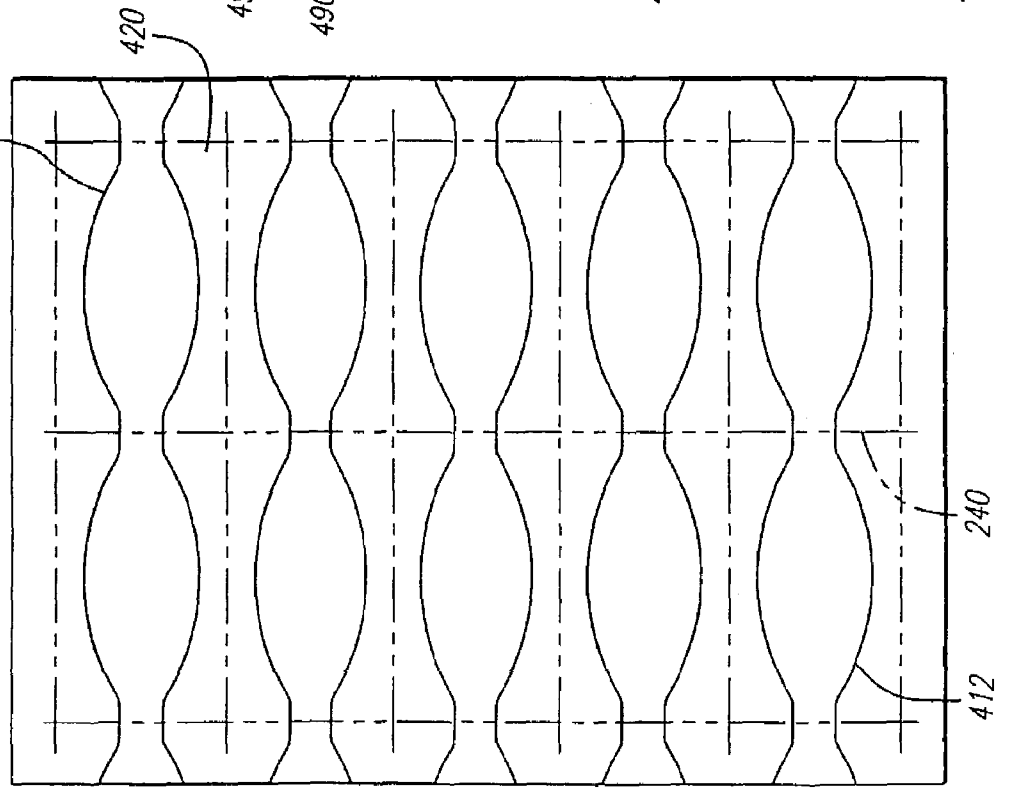
FIG. 17 is a back view of a fourth laminated sheet construction of the present invention.
Figure 18:
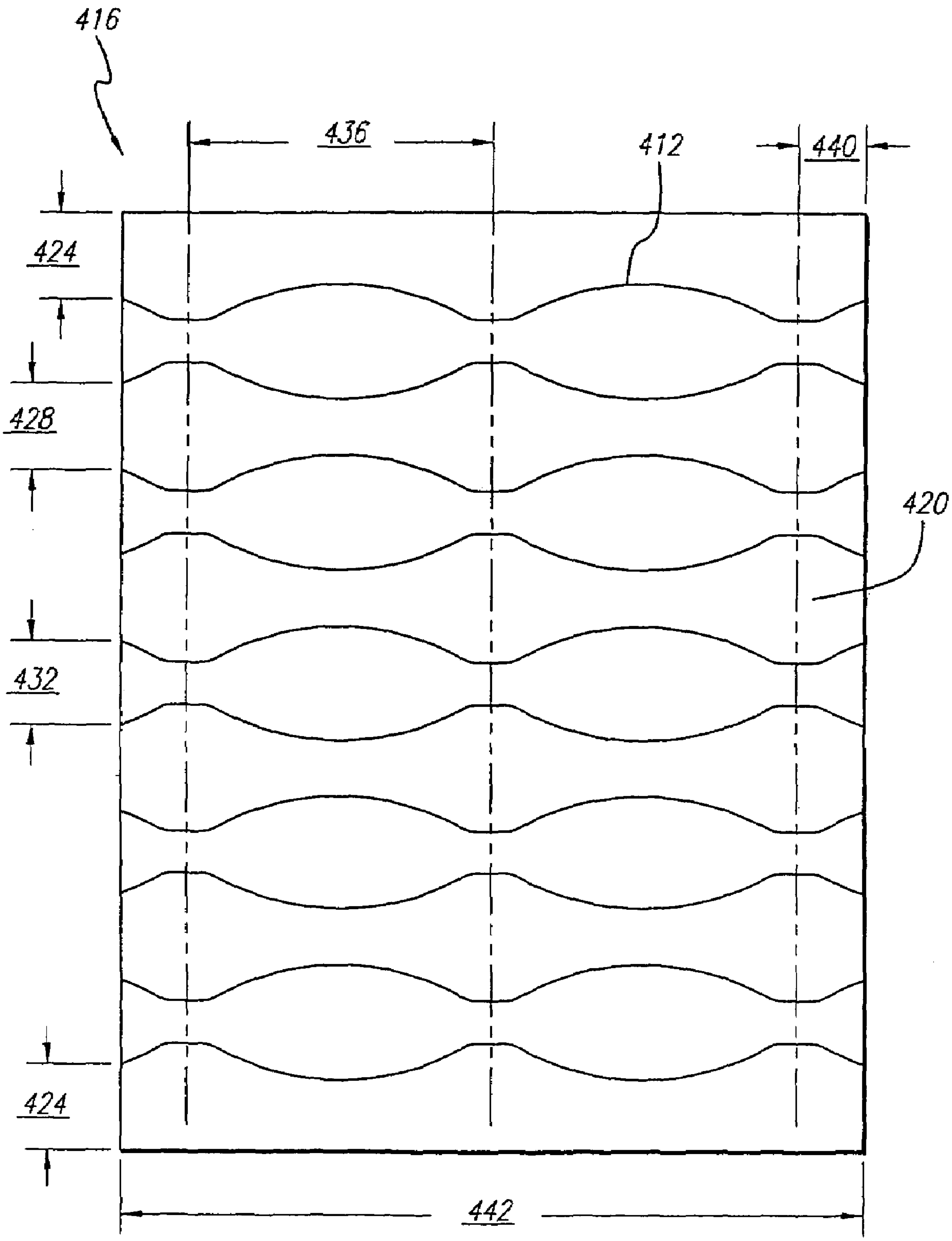
FIG. 18 is a view similar to FIG. 17 and of the fourth laminated sheet construction.

The liner-sheet cut lines 300, 384 are discussed above and as shown in the corresponding drawing figures are all straight lines. However, it is also within the scope of the invention to make them curving or wavy, and a sheet construction embodiment having wavy or curving lines 412 is illustrated generally at 416 in FIG. 17. It is seen therein that the liner-sheet cut lines 412 on opposite sides of the strips 420 thereby formed have opposite or mirror images. Referring to FIG. 18, preferred dimensions 424, 428, 432, 436, 440 and 442 are 27/32, 1, 1 11/32, 3½, ¾ and 8½ inches, respectively. The sheet construction embodiment 416 is fed into the printer or copier 230 in the condition as illustrated in FIG. 17, that is, none of the liner strips has been removed. A variation thereon is illustrated by the sheet construction shown generally at 450 in FIG. 19 wherein alternating ones of the strips (five eye-goggle shaped strips) have been removed exposing the back surface of the facestock laminate as shown at 454.

Figure 19A:
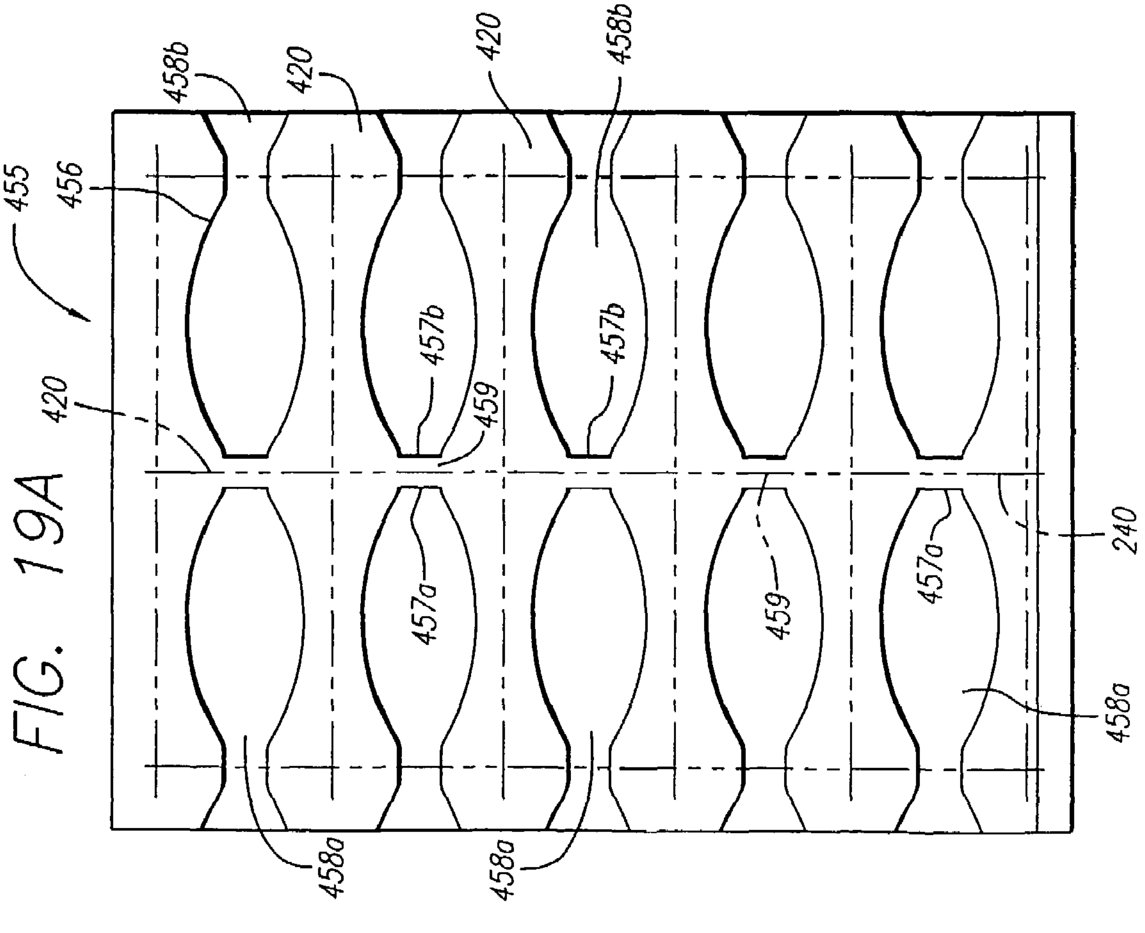
FIG. 19A is a back view of sixth laminated sheet construction of the present invention.
Figure 19:
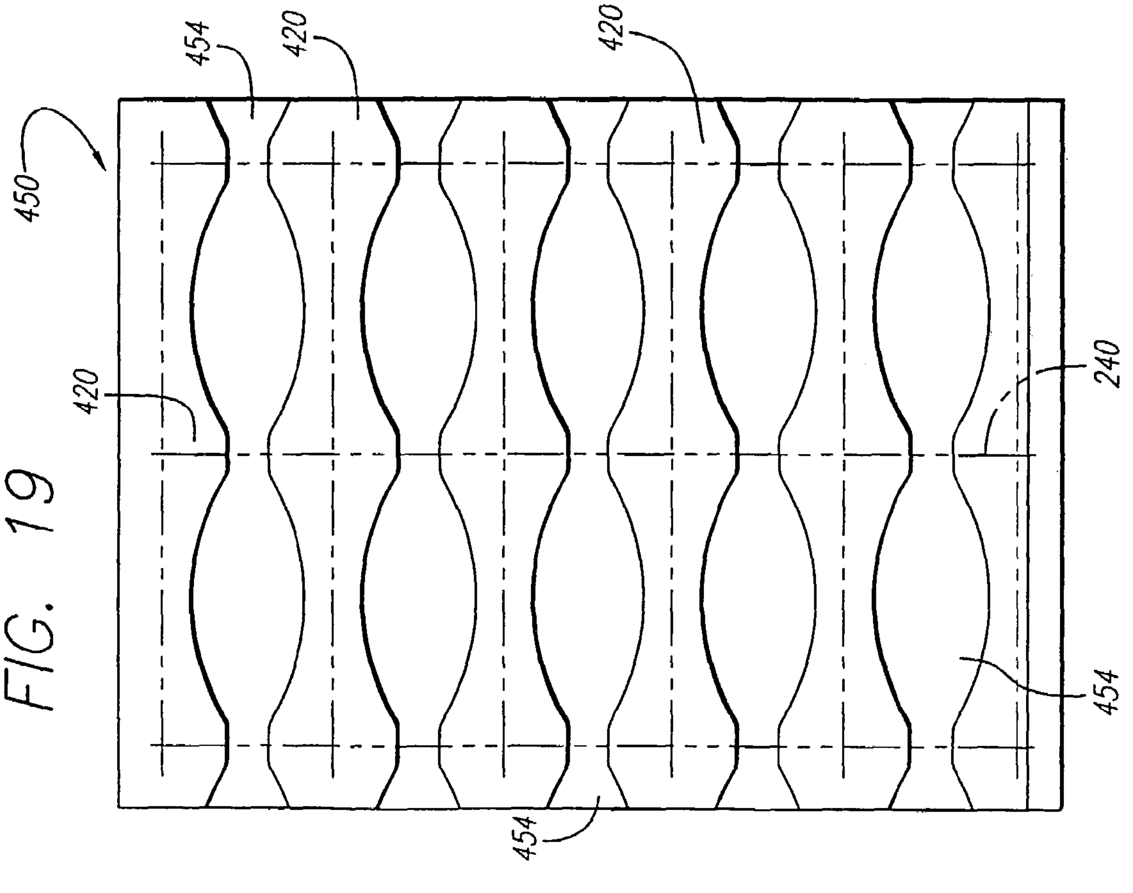
FIG. 19 is a back view of a fifth laminated sheet construction of the present invention.

It is also within the scope of the present invention for the liner-sheet cut lines and thus the liner strips to not extend from one side or edge of the sheet to the other. A sheet construction embodying such a configuration is shown in FIG. 19A generally at 455. Essentially the only difference between sheet construction 455 in FIG. 19A and sheet construction 450 in FIG. 19 is that the wavy liner-sheet cut lines 456 do not extend from one side of the sheet to the other. Rather, they stop near the center of the liner sheet and short connector lines 457*a*, 457*b* form pairs of oppositely-facing fish-shaped strips, which when removed expose pairs of oppositely-facing fish-shaped portions 458*a*, 458*b* of the laminate facestock. (For straight liner-sheet cut lines, instead of wavy cut lines, the exposed shapes would be rectangles instead of fish shapes.) Strips 459 of the liner sheet remain between the adjacent pairs of connector lines 457*a*, 457*b*. The strips 459 cover portions of the central vertical facestock cut lines and thereby help to maintain the integrity of the sheet construction.

Figure 20:
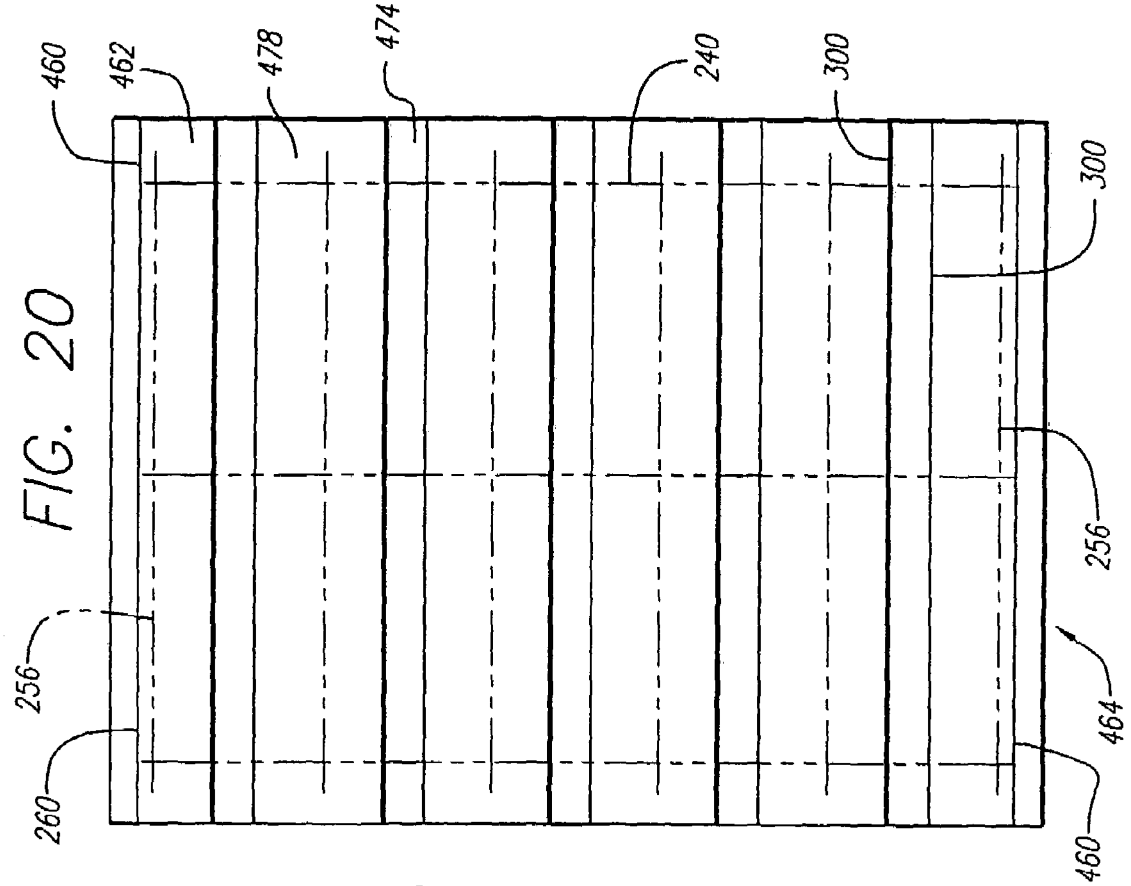
FIG. 20 is a back view of a seventh laminated sheet construction of the present invention.

Flexibility of the sheet constructions at both ends thereof is important. Accordingly, referring to FIG. 20, flexibility cut lines 460 are formed in the end liner strips 462 extending the full width of the strips in the sheet construction embodiment shown generally at 464 and which is similar to the wide strip embodiment of FIG. 13. The dotted lines in that figure show the locations of the facestock cut lines 240 in the laminate facestock 220 and are included in the figure to illustrate the relative positioning of the liner-sheet cut lines 300 (and the strips thereby formed) and the facestock cut lines 240. As can be seen the flexibility cut lines 460 are positioned between the ends of the sheet construction and the adjacent end frame cut lines 256. This provides flexibility to the end portions of the waste frame 260. The flexibility cut lines 460 are preferably formed in the same operation (die cutting) as the liner-sheet cut lines 300. So another way to view the flexibility cut lines 460 is that they are simply liner-sheet cut lines at the ends of the liner sheet 208 where the adjacent strips thereby formed are not removed. The thin liner strips are removed from locations 474 in the illustrated embodiment. And the remaining wide strips 478 are positioned over, covering and overlapping each of the facestock horizontal grid cut lines.

Figure 21:
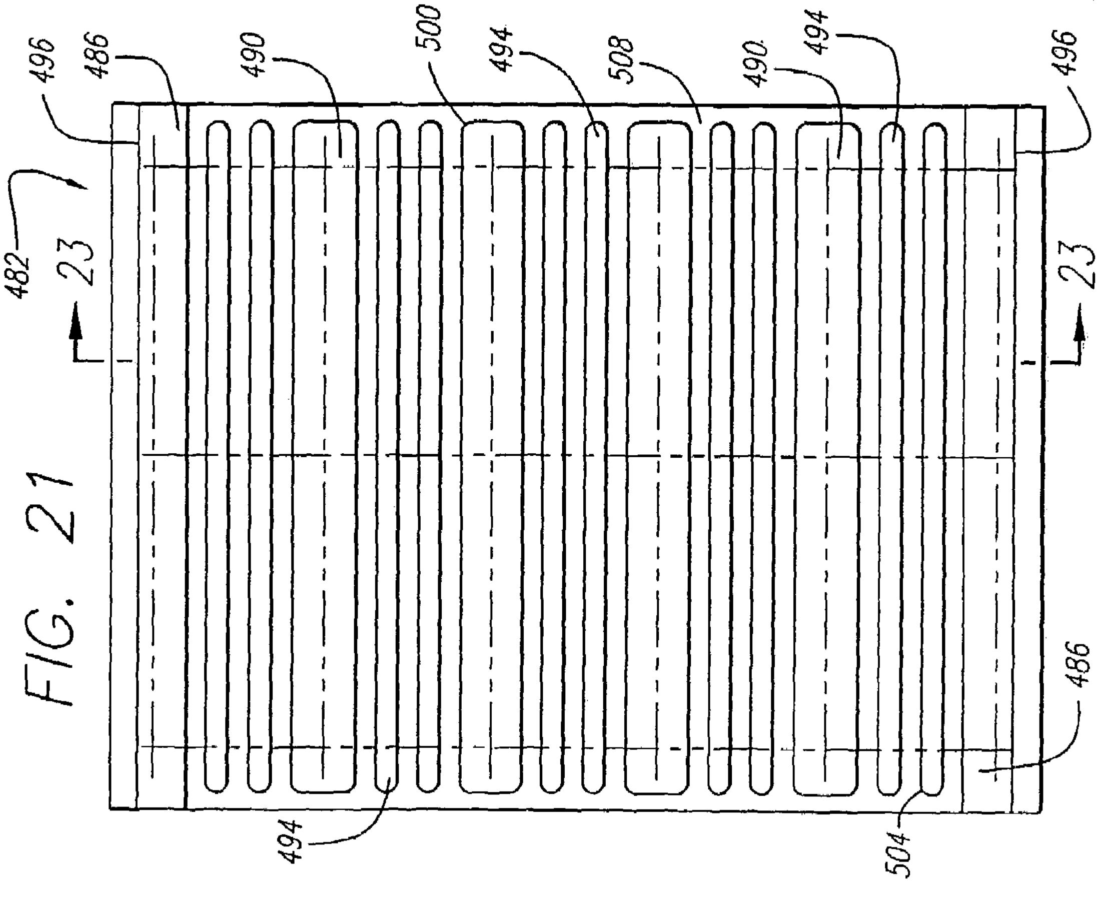
FIG. 21 is a back view of an eighth laminated sheet construction of the present invention.

A preferred embodiment of the liner sheet or the liner-sheet cut lines 300 and liner strips is illustrated by sheet construction shown generally at 482 in FIG. 21. Referring thereto, it is seen that the liner-sheet cut lines form three different types of strips, namely, (two) end wide strips 486, (four) central wide strips 490 and (ten) thin strips 494. The end wide strips 486 are provided at both ends of the sheet and extend the full width of the sheet and along the entire edge thereof. Flexibility cut lines 496 are provided in each of the end wide strips 486, positioned similar to those in the FIG. 19 embodiment. The central wide strips 490 cover each of the horizontal facestock grid cut lines. They are not quite as wide as the corresponding strips in FIG. 19. Thus, more of the frame vertical facestock cut lines are exposed on the liner side of the sheet. This can result in them bowing out and snagging as the sheet winds its way through the printer or copier 230.

Accordingly, the sheet construction 482 of FIG. 21 provides for thin strips 494 positioned between and parallel to the wide strips 486, 490. These thin strips 494 cross over each of the vertical facestock cut lines and thereby prevent the potential bowing out problem. Two of the thin strips are provided between each of the neighboring wide strips. Of course, it is within the scope of the invention to provide for only one thin strip between the neighboring wide strips or to provide for more than two thin strips, or to make them the same width as the wide strips or to eliminate them altogether. The central wide strips 490 and the thin strips 494 all have rounded corners 500, 504.

Figure 22:
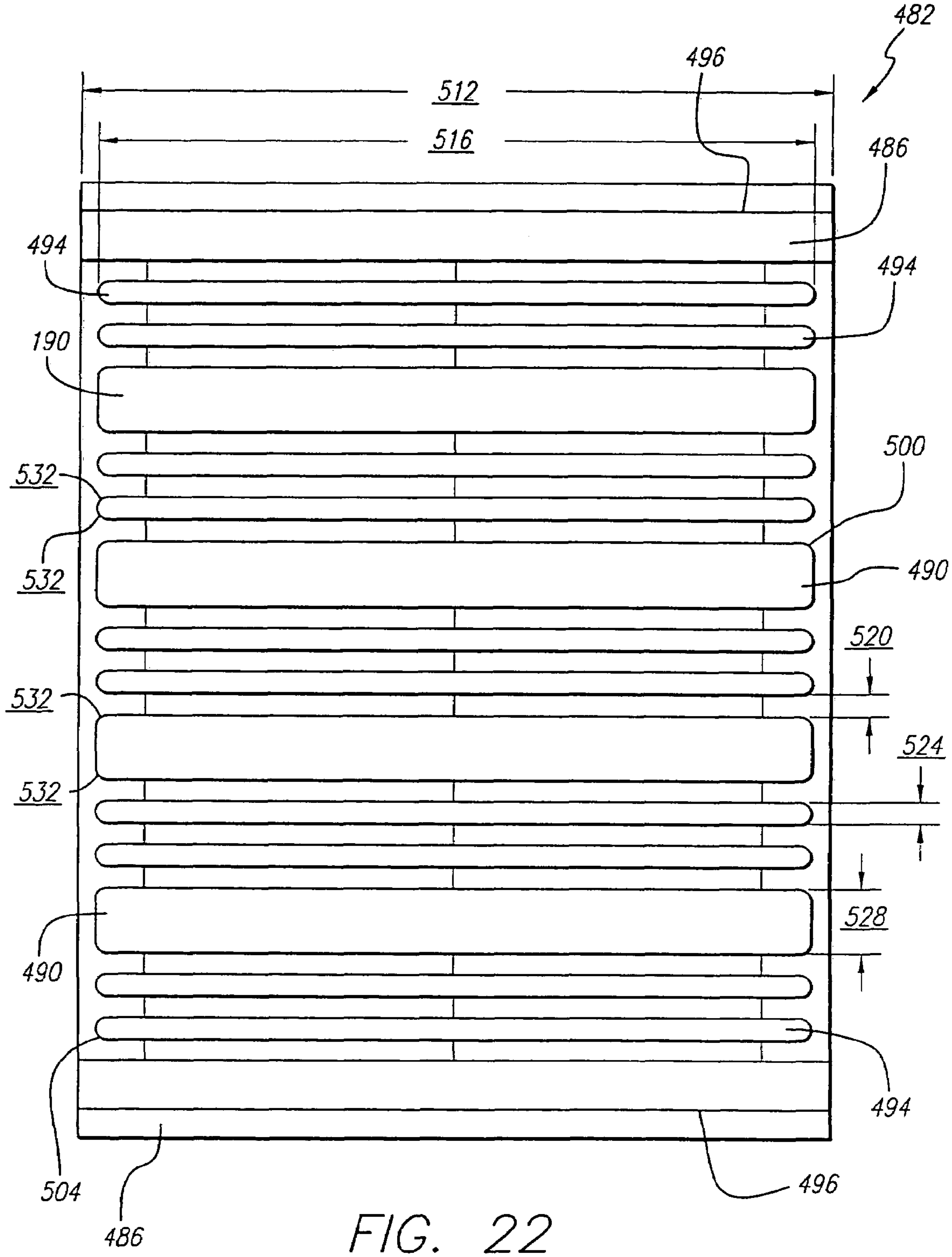
FIG. 22 shows the dimensions of the strips of FIG. 21.

Each of the thin strips 494 and each of the central wide strips 490 extend a distance past the vertical frame cut lines, but not to the edge of the sheet. In other words, a liner edge or margin is left on both sides extending between the end wide strips 486. What this means is that the liner sheet "strips" which are removed after the liner-sheet cut lines are made and before the sheet construction is sent to the user for a printing operation are interconnected into a web or matrix. That is, all of the liner portions (or strips) between the thin strips 494 and the adjacent wide strips 486, 490 and between the adjacent thin strips are connected to the borders or margins and thereby to each other in a continuous web or matrix. Thus, by grabbing any portion of this matrix, and preferably a corner thereof, the entire matrix can be pulled off of the laminate facestock in essentially one step. As will be described with reference to FIG. 25, each of the matrices of the sheet construction web is wound onto a roll and the roll subsequently discarded. This is easier, faster, quicker and cheaper than pulling a number of individual liner waste strips off of the laminate facestock as is done when the strips are not interconnected. The dimensions of the strips and their spacings as shown by dimensions 512, 516, 520, 524, 528 and 532 in FIG. 22 are 8½, 8, ¼, ¼, ¾ and ⅛ inches, respectively.

Figure 24:
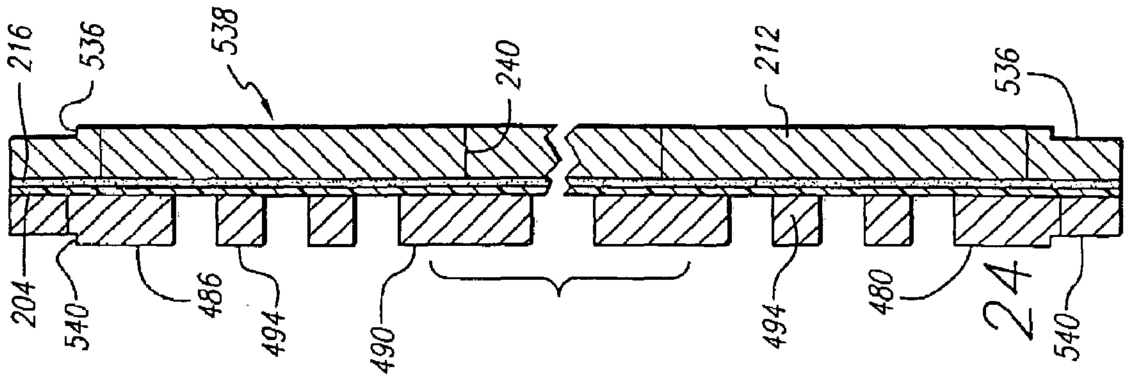
FIG. 24 is a view similar to FIG. 23, but showing a ninth laminated sheet construction of the present invention.
Figure 23:
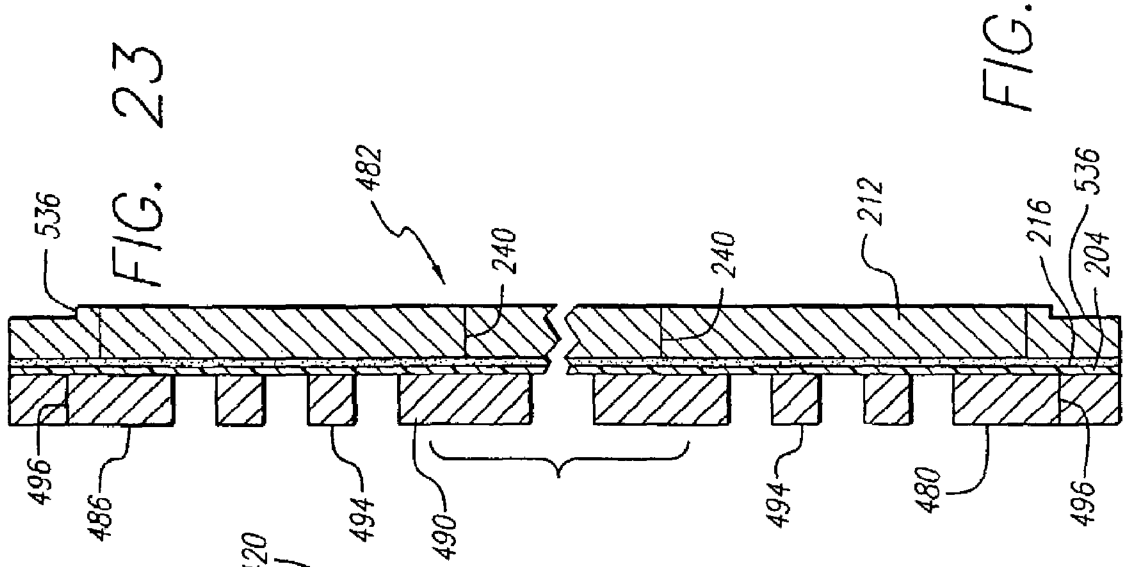
FIG. 23 is an enlarged cross-sectional view taken on line 23—23 of FIG. 21.

Both end edges are crushed or calendered as can be seen in FIG. 23 at 536, preferably on the facestock side, but in the waste frame portion and not extending into the central area on the printable media. Alternatively and referring to the sheet construction as shown generally at 538 in FIG. 24, both sides can be crushed or calendered or only the liner sheet side as shown at 540.

Figure 25:
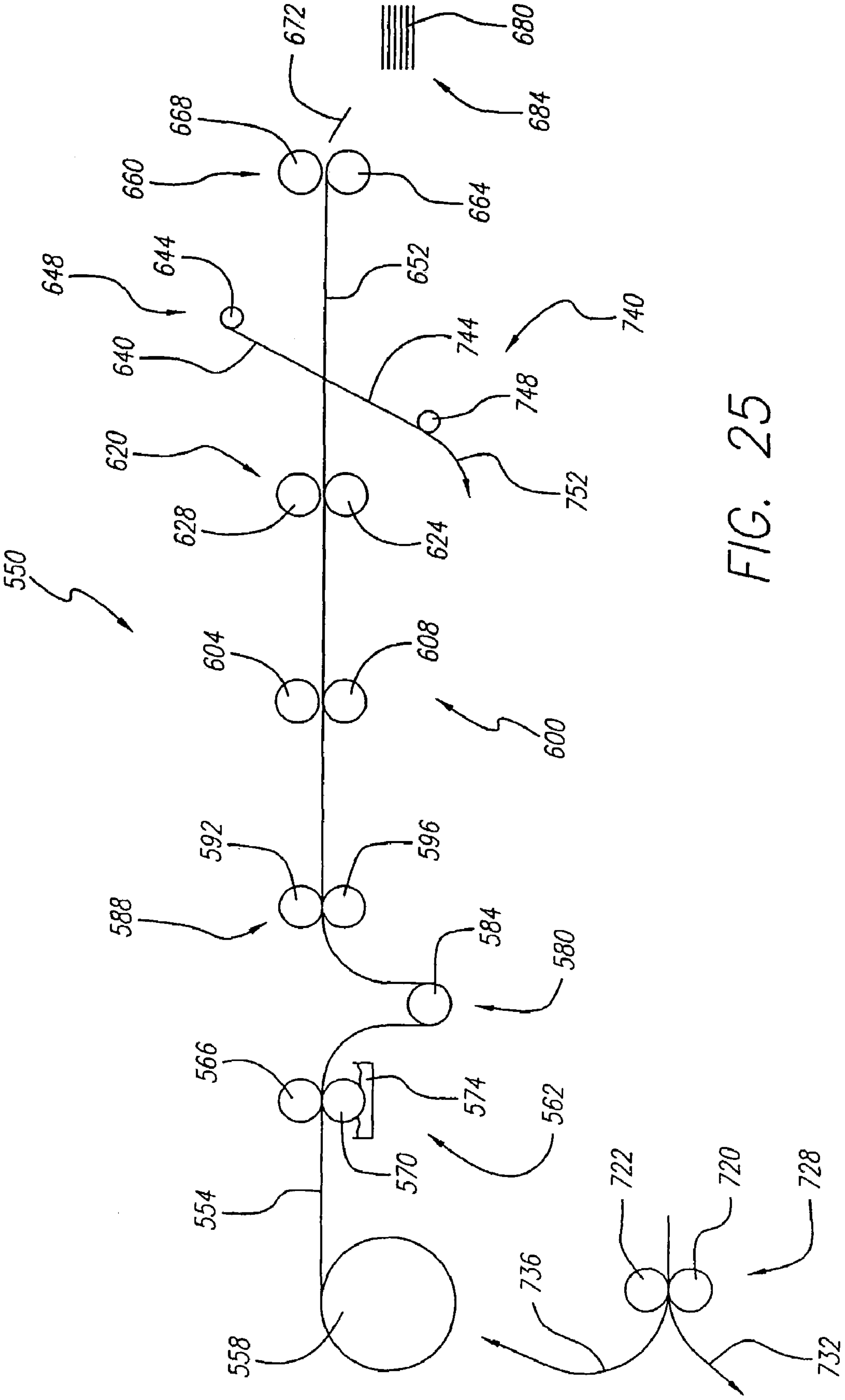
FIG. 25 is a schematic view showing a process and system of making the sheet constructions of FIGS. 21 and 26.

A schematic view of the system and process for manufacturing the laminate sheet construction 482 of FIG. 21 is illustrated in FIG. 25 generally at 550. Each of the successive steps or stations is illustrated from left to right in that drawing figure. As shown, a web 554 of the dry laminate facestock formed as described previously and rolled on a roll 558 is delivered from the Avery Dennison Fasson Division, for example, to the press facility, such as a Webtron (Canada) Model 1618 press. At the press facility, the roll 558 is unwound with the facestock side up and the liner side down and is delivered to the printing station shown generally at 562, and which includes a print cylinder 566, an anilox roll 570 and an ink supply 574. At the printing station 562, desired identifying and informational indicia are printed on the facestock of the laminate such as on the frame portion. This indicia can include product code identification, the manufacturer's or distributor's name and logo, and patent numbers, if any.

The web 554 is then pulled to the turning station shown generally at 580 where a turn bar 584 turns the web over so that the liner side is facing up and the facestock side is facing down for delivery to the calendering station. At the calendering station shown generally at 588 and including an anvil 592 and a calendering die 596, both edges of the web on the facestock side thereof are crushed for about 7/16 inch from a 13.4 mil thickness to approximately 10.4 mil.

The web 554 is pulled further to the two die cutting stations. The face cutting station shown generally at 600 includes an anvil 604 and a face cutting die 608, with the anvil positioned on top. At this station the face of the web 554 is cut up to the liner but without cutting the liner to create the business card shapes on the face with cut lines, as previously described. At the liner cutting station as shown generally at 620, the anvil 624 is positioned below the liner cut die 628, in a relative arrangement opposite to that at the face cutting station 600. The liner at this station 620 is die cut up to the face without cutting the face. At these die cutting stations 600, 620 a bridge bears down on the die bearers, which forces the die blades to cut into a predetermined portion of the caliper or thickness of the web. This portion is called a step, and is the difference between the bearer and the end of the die cutting blades. The smaller the step, the deeper the cut into the web, as would be understood by those skilled in the die cutting art.

The liner cutting forms the waste matrix 640 of the liner sheet. This matrix 640 is grabbed and pulled off of the web 554 and wound onto a roll 644 at the waste matrix station, which is shown generally at 648. The finished web 652 is thereby formed and delivered to the sheeting station. The calendering station 588, the face cutting station 600, the liner cutting station 620 and the waste matrix station 648 can essentially be arranged in any order except that the waste matrix station must follow the liner cutting station.

The sheeting station which is shown generally at 660 includes an anvil 664 and a sheeter cylinder 668. The eleven-inch wide web 652 is sheeted into eight-and-a-half inch sheets 672. Of course, if different sizes of sheets 672 (or 482) are desired (such as 8½ by 14 inch or A4 size) then the width of the web and/or the sheeting distance can be altered or selected as needed. The final sheet constructions 672 (or 482) are shown stacked in a stack 680 at the stacking station, which is illustrated generally at 684. Each stack 680 of sheets can then be packaged and distributed to the end user through normal retail distribution channels.

Figure 12:
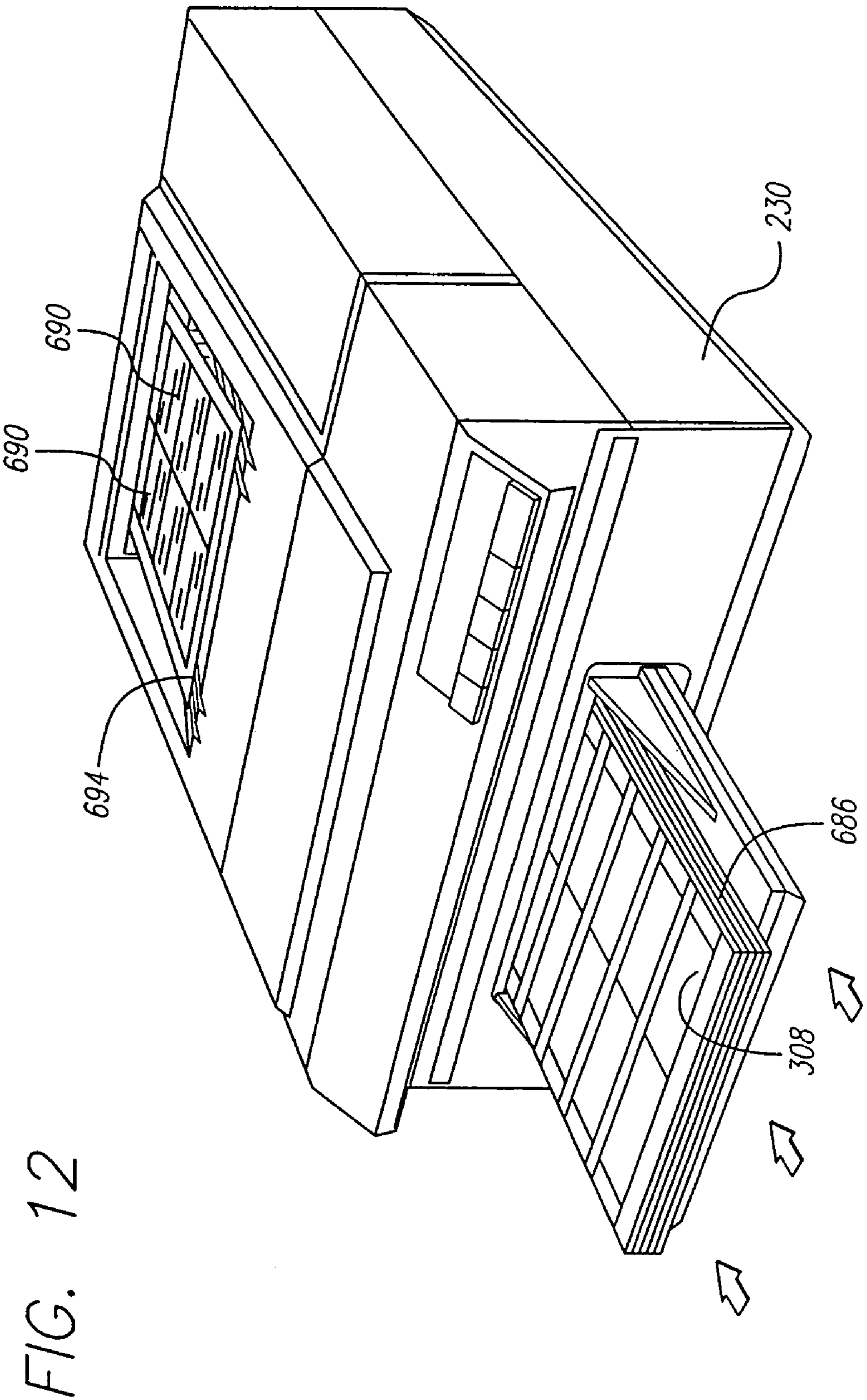
FIG. 12 is a perspective view showing a stack of laminated sheet constructions of the present invention operatively positioned in an automatic feed tray of a printer or copier waiting to be individually fed therein for a printing operation and a sheet from the stack having already been printed.

The end user then unpackages the sheets and stacks them in a stack 686 in the infeed tray 694 of a printer (particularly an ink jet printer) or copier 230, such as shown in FIG. 12. (FIG. 12 shows sheet construction 200 and not 482.) The sheet construction 482 has tested well in ten sheet stack (684) automatic feeding tests in the following printers: HP DH 550/660C, Canon BJC 4100, Canon BJC 620, Epson Stylus Color 600 and Epson Stylus Color II. The printer or copier 230 preferably should not have temperatures above the melting point of the LDPE used in the sheet construction. During the printing operation by these printers 230, the desired indicia 690 is printed on each of the printable media or cards. This indicia 690 can include the user's (or card owner's) name, title, company, address, phone number, facsimile number, and/or e-mail address, as desired. The printed sheet constructions are shown in the outfeed tray 694 of the printer 230 in FIGS. 4 and 12. FIG. 4 shows an individual manual feed of the sheet constructions.

Figure 5:
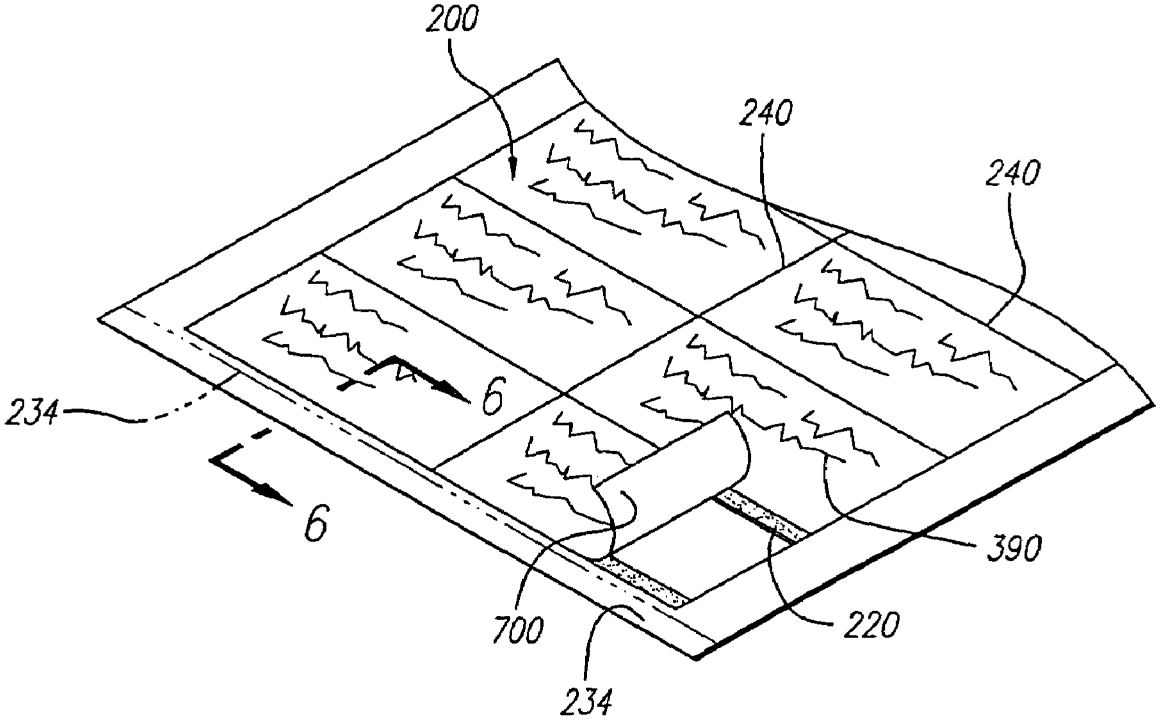
FIG. 5 is a view similar to that of FIG. 2 but of a first laminated sheet construction of the present invention, such as is shown in FIG. 4.

The individual printed media or business cards 700 are then peeled off of the rest of the sheet construction in an operation as shown in FIG. 5, for example. The remaining laminate facestock frame and liner strip product is disposed of. The result is a stack of neatly and accurately printed business cards 700. Each of the cards 700 has clean die cut edges defining its entire perimeter. The cards 700 were efficiently and quickly printed by the process(es) of this invention, since the sheet constructions can be stacked in the infeed tray and automatically fed into and through the printer 230, unlike the prior art.

Figure 26:
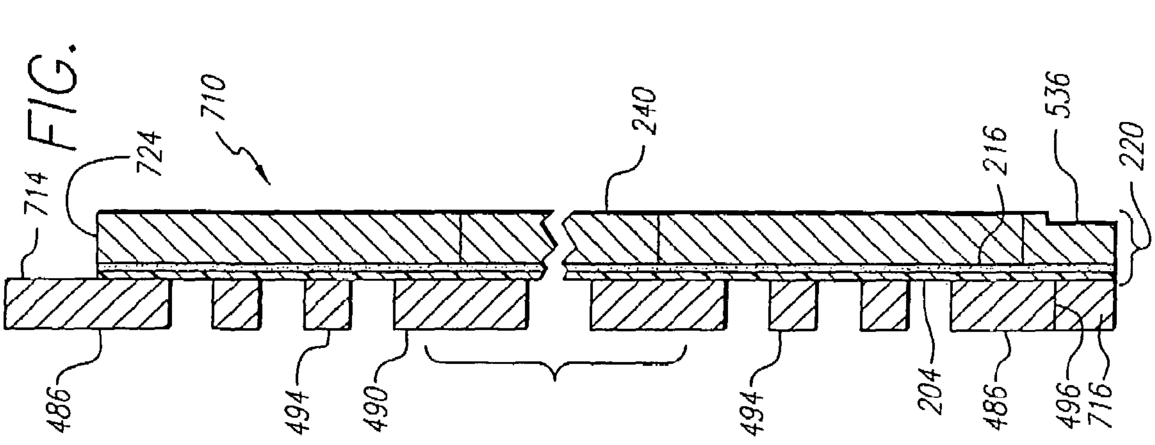
FIG. 26 is a view similar to FIG. 23, but showing a tenth laminated sheet construction of the present invention.

A further preferred embodiment of the present invention is shown generally at 710 in FIG. 26. Sheet construction 710 is similar to sheet construction 482 except at one end of the sheet—the top end as shown in FIG. 26. Referring thereto, the laminate facestock 220 (and/or the liner sheet 208) is not calendered to make the end edge of sheet construction 710 thinner and thereby easier to efficiently feed into the printer or copier. Instead a one-half inch strip of the laminate facestock 220 is stripped off of the liner sheet leaving only a thin infeed liner strip 714 at that end of the sheet construction. The infeed liner strip 714 is well suited for vertical feed printers because it allows the sheet to easily curve under the infeed roller(s). And the opposite calendered end is well suited for feeding into horizontal feed printers because of the straight path the sheet(s) take(s) to engage the infeed roller(s). Indicia can be printed on the (front) frame of the laminate facestock 224 instructing the user as to which end of the sheet construction 710 defines the infeed end for vertical feed printers and for horizontal feed printers. A preferred embodiment of sheet construction 710 removes the end liner strip 716 defined by line 496.

Two alternative systems or method for stripping the laminate facestock strip are illustrated in FIG. 25. For both embodiments only one edge is crushed at the calendering station 588. According to one, the laminate facestock is die cut by die 720 (and anvil 722) along die cut line 724 (FIGS. 26–28) at the stripping station shown generally at 728 and the strip removed from the web as shown by arrow 732. (Alternatively, the facestock can be on top of the web for this step.) The die cut line 724 can be the same as the top frame cut line so that there is no "frame" along the top. The stripped web is then wound back onto a roll (558) and placed into position on the facility 588 as denoted by arrow 736. The stripped roll is placed back on the press prior to station 562, in the same place as 558, as shown in FIG. 25.

The other method or system does not use the separate stripping station 728. Instead the stripping is conducted in the facility 550. The die cut line 724 is made at the face cutting station 600. The facestock strip is then removed at the removal station shown generally at 740, which can be part of waste matrix station 648. At removal station 740, the face strip 744 is wrapped around a driven roll 748 and exhausted using an air line 752 into a vacuum system.

The arrangement of having one end of a sheet construction formed by stripping a strip (744) of a face sheet (such as laminate facestock) off of a backing sheet (such as a liner sheet) can be used not only on sheet construction 710 and the other previously-described sheet constructions but also on generally any multi-sheet construction.

Figure 28:
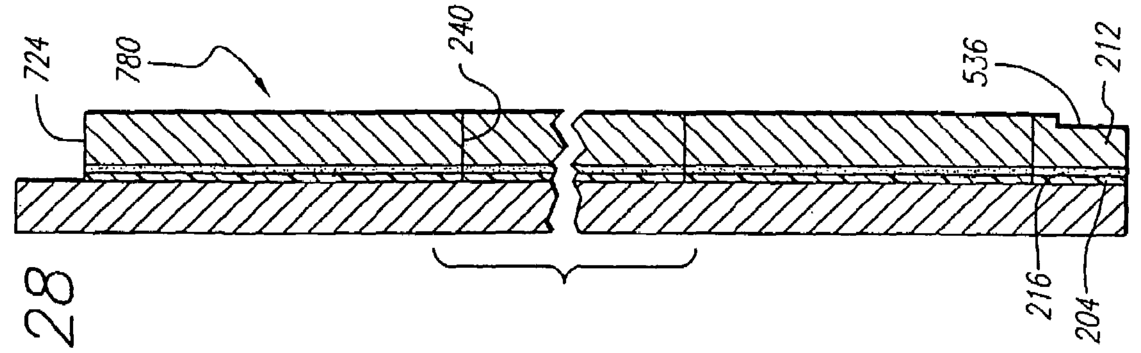
FIG. 28 is an enlarged cross-sectional view taken on line 28—28 of FIG. 27.
Figure 27:
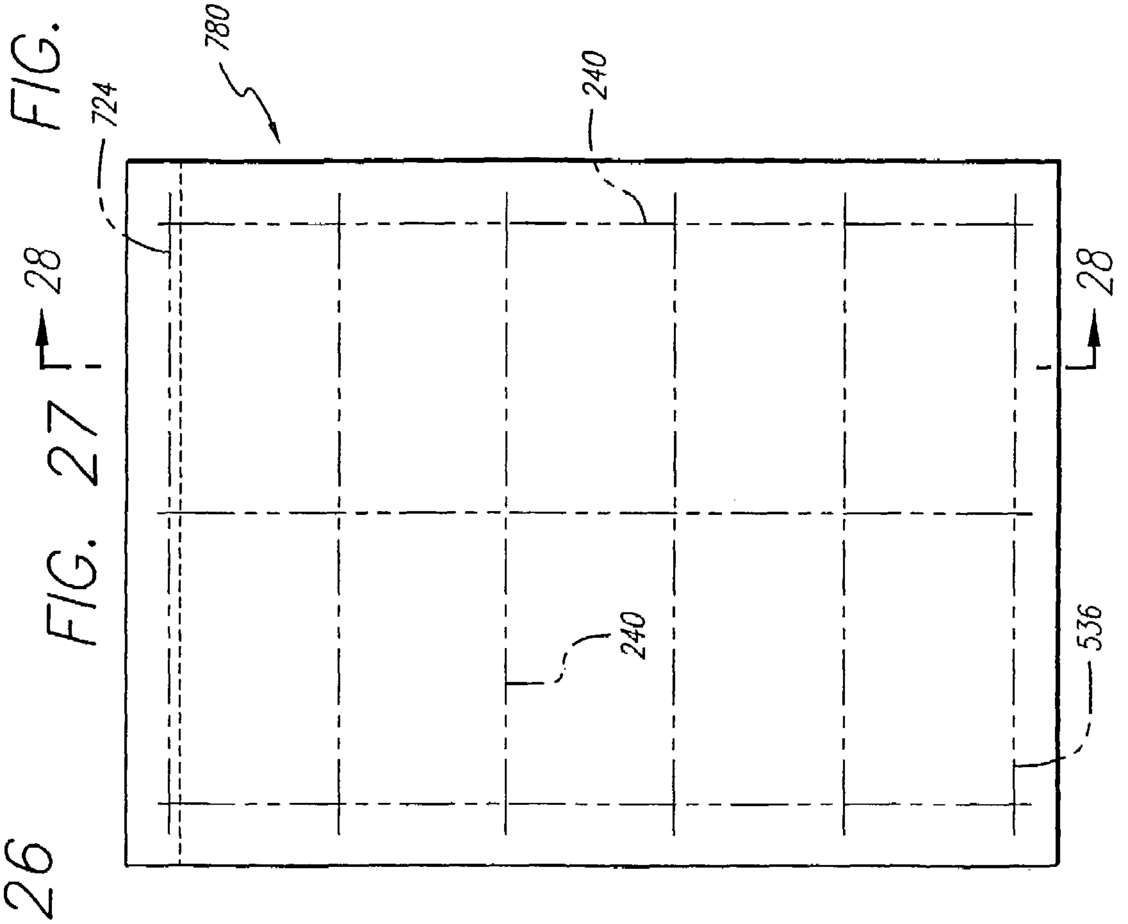
FIG. 27 is a front view of an eleventh laminated sheet construction of the present invention.

An example thereof is the sheet construction shown generally at 780 in FIGS. 27 and 28. Referring thereto, the laminate facestock construction is the same as that of FIG. 26, for example. It similarly has the face cut lines 240, the strip cut line 724, and the calendered end 536. However, the liner 212 is a solid sheet with no cut lines or strips formed or removed. Instead of a dry laminate construction, it can be simply a face sheet adhered directly to a backing sheet with adhesive. And the facesheet separation lines (240) instead of being die cut can be microperfed. It still has the advantage of an efficient feed into a vertical feed printer using one end of the construction as the infeed end and using the other for efficient feed into a horizontal feed printer.

Figure 29B:
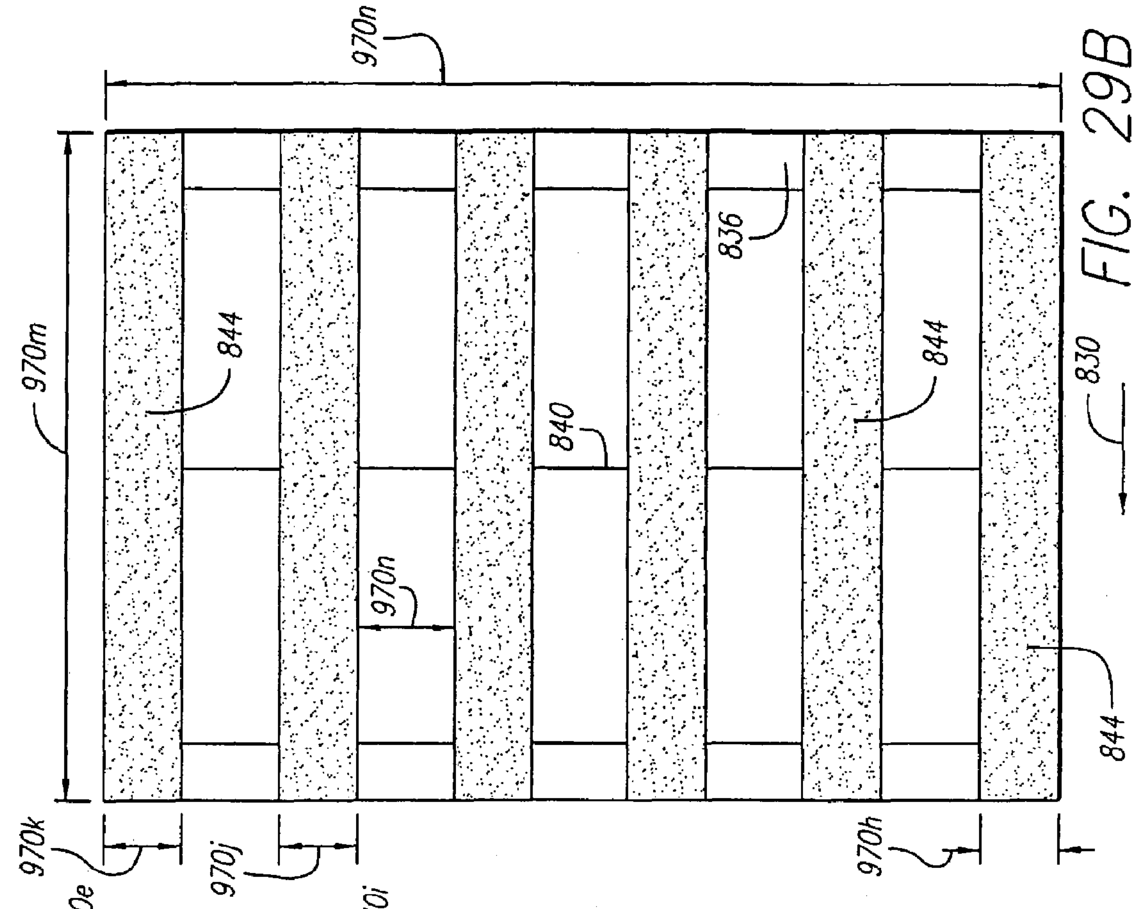
FIGS. 29A and 29B are front and back views, respectively, of a first version of a preferred business card sheet construction of the present invention.
Figure 29A:
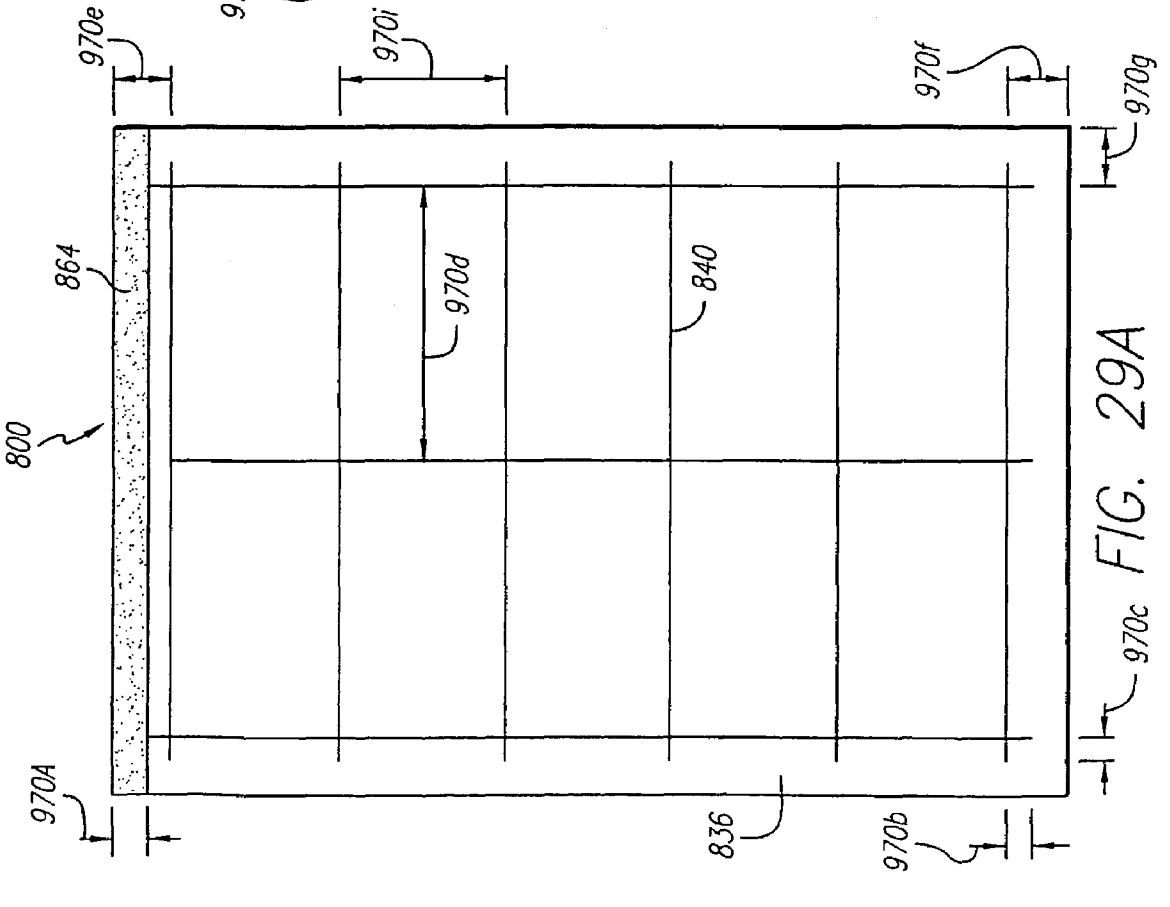
Figure 30B:
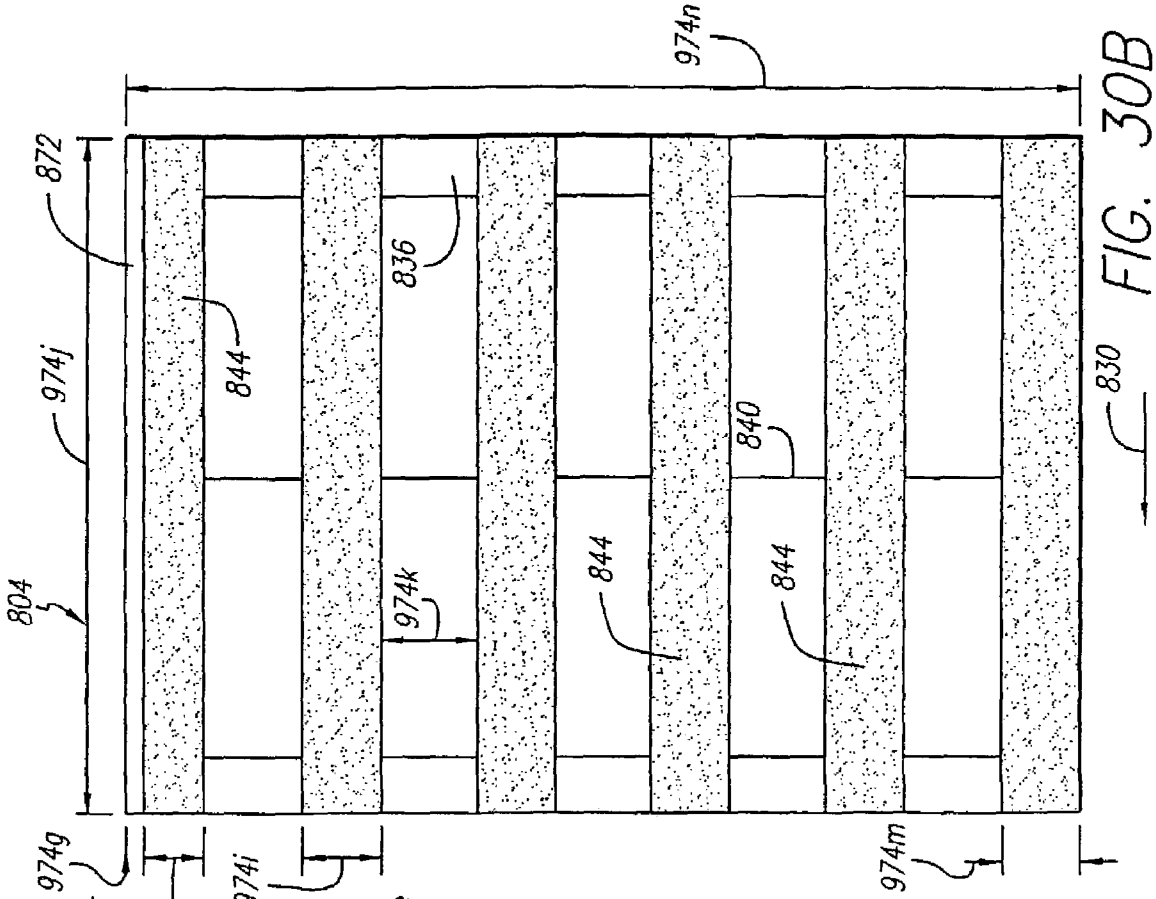
FIGS. 30A and 30B are front and back views, respectively, of a second version business card sheet construction.
Figure 30A:
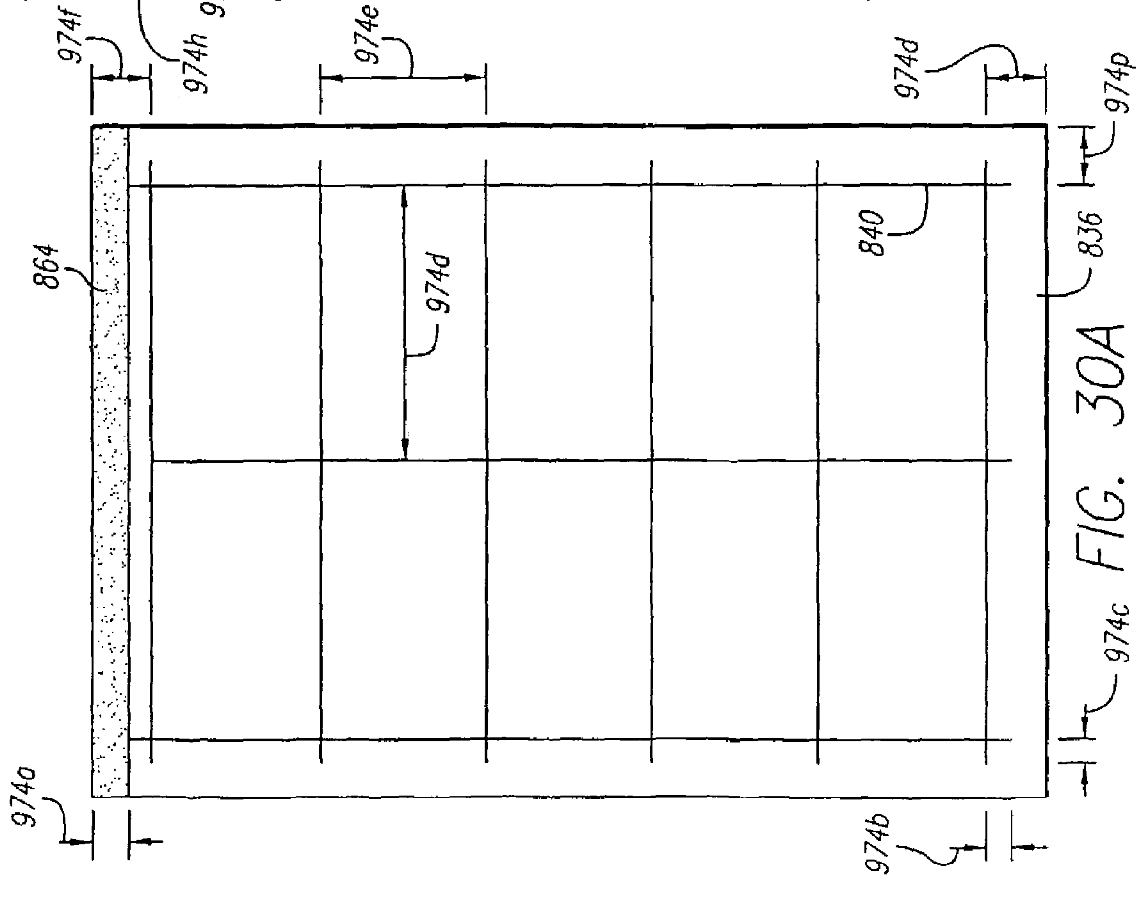
Figures 31A, 31B:
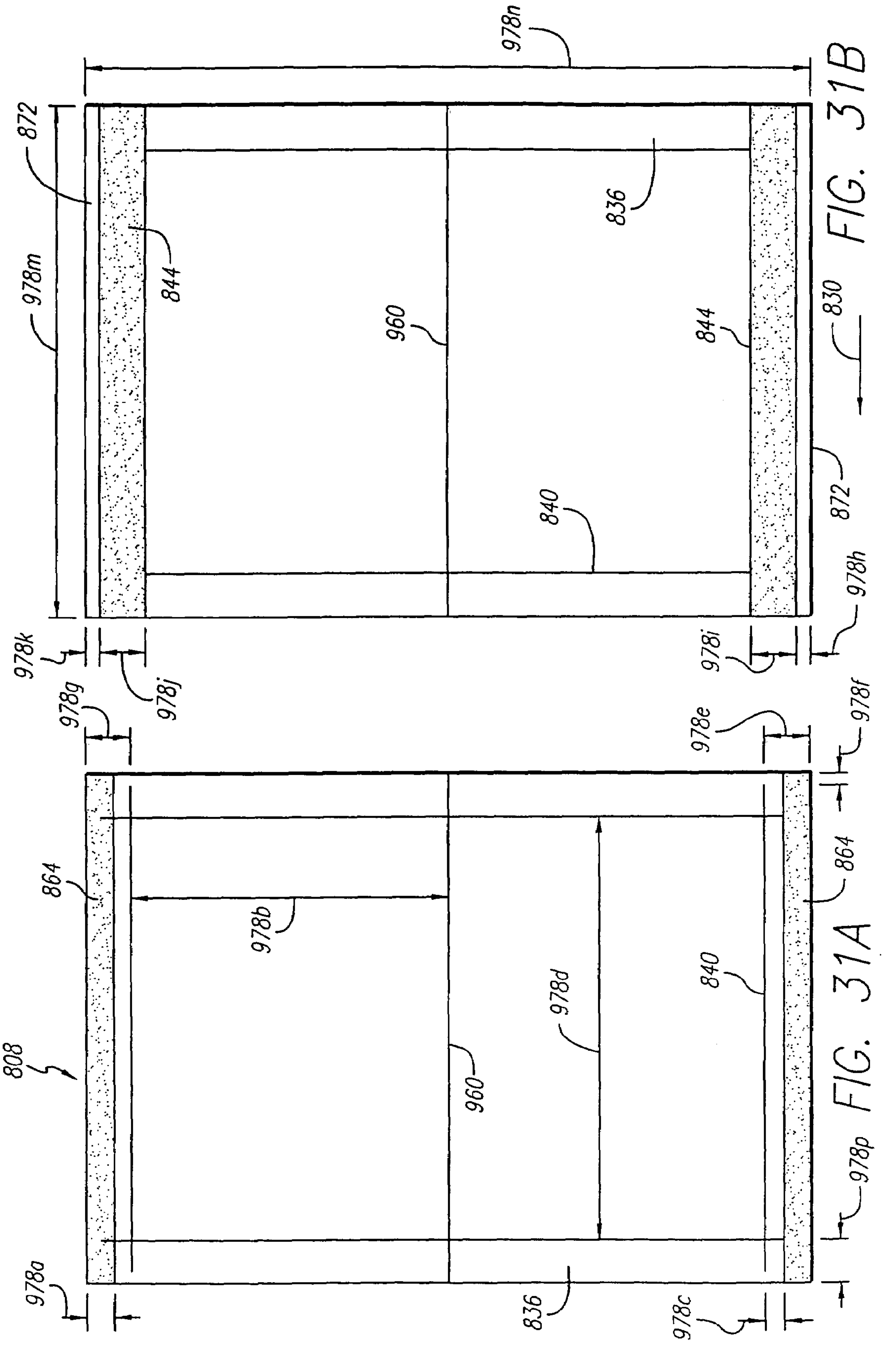
FIGS. 31A and 31B are front and back views, respectively, of a first version greeting card sheet construction of the present invention.
Figure 32B:
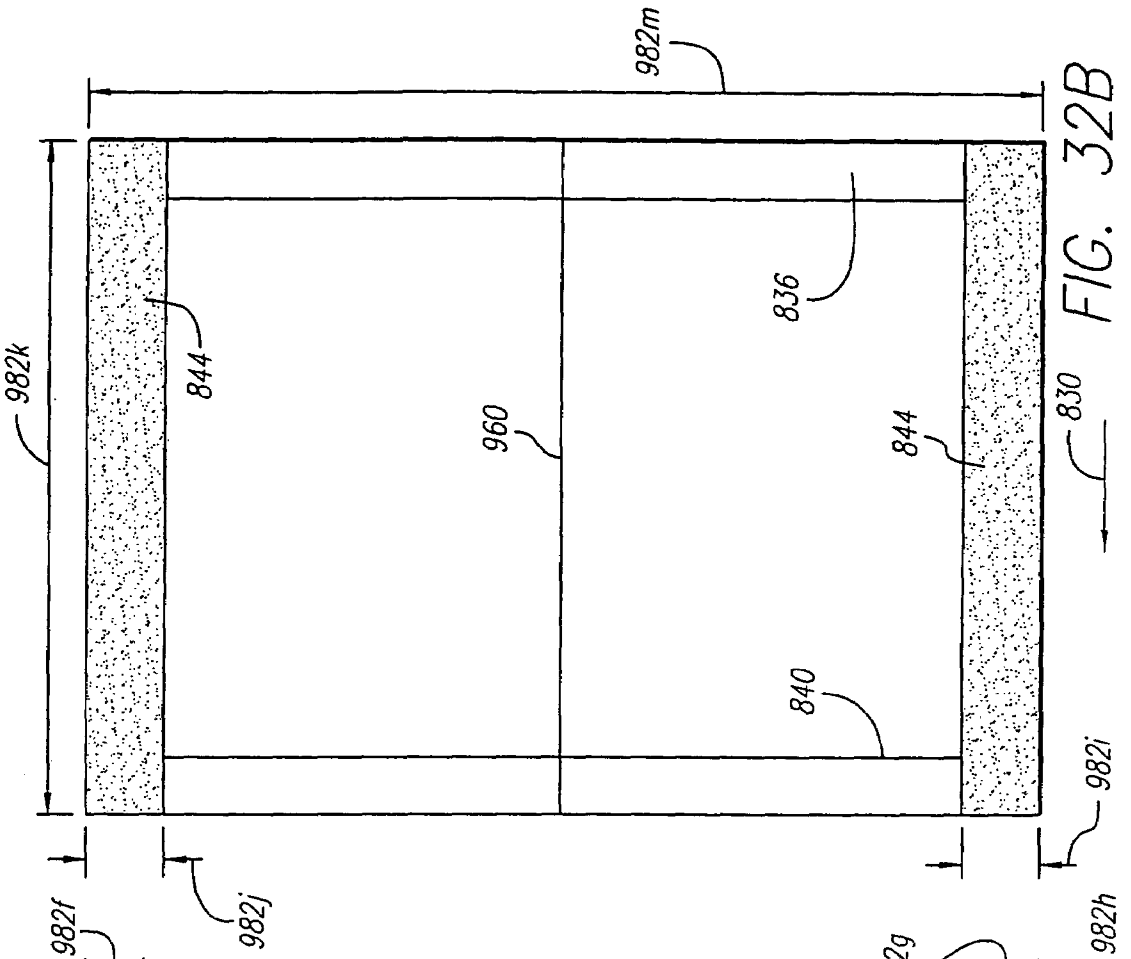
FIGS. 32A and 32B are front and back views of a second version greeting card sheet construction.
Figure 32A:
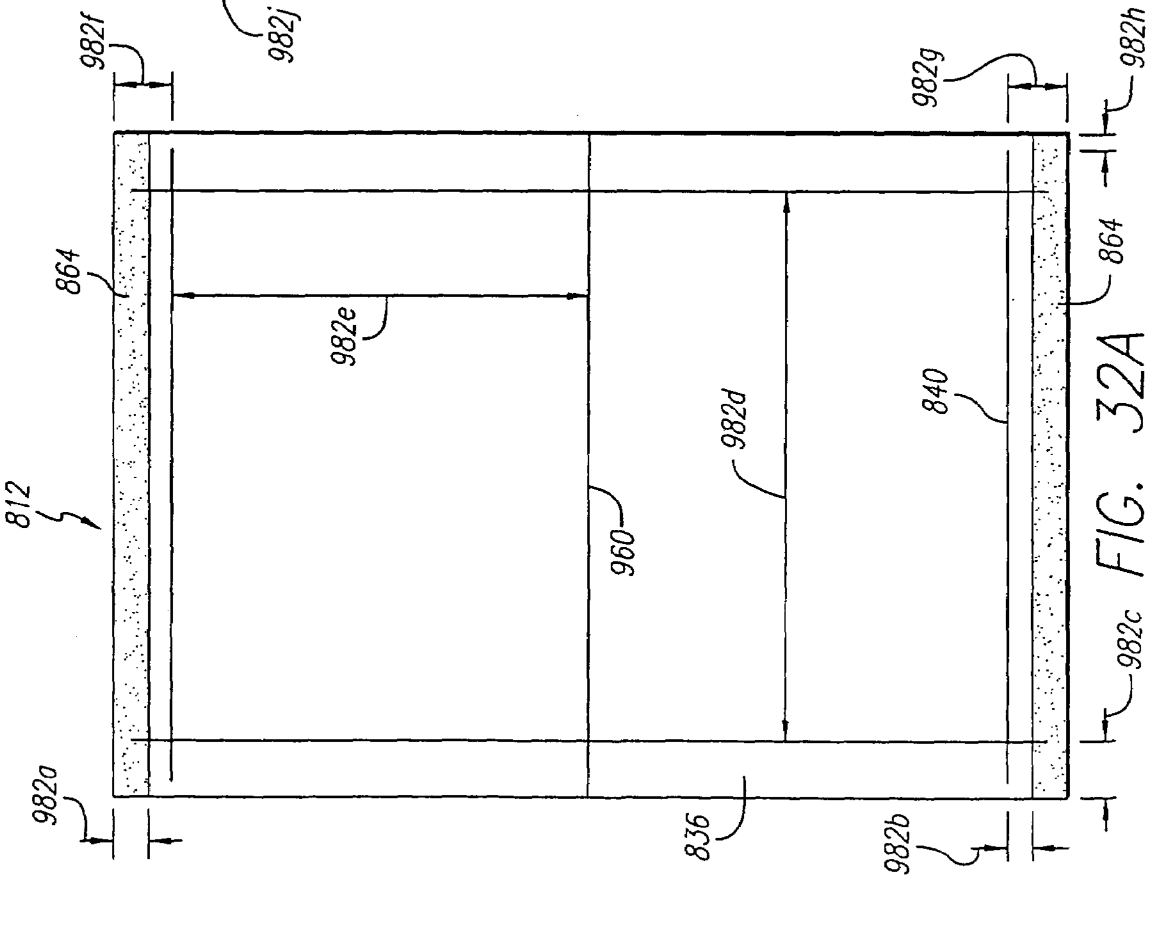
Figure 33B:
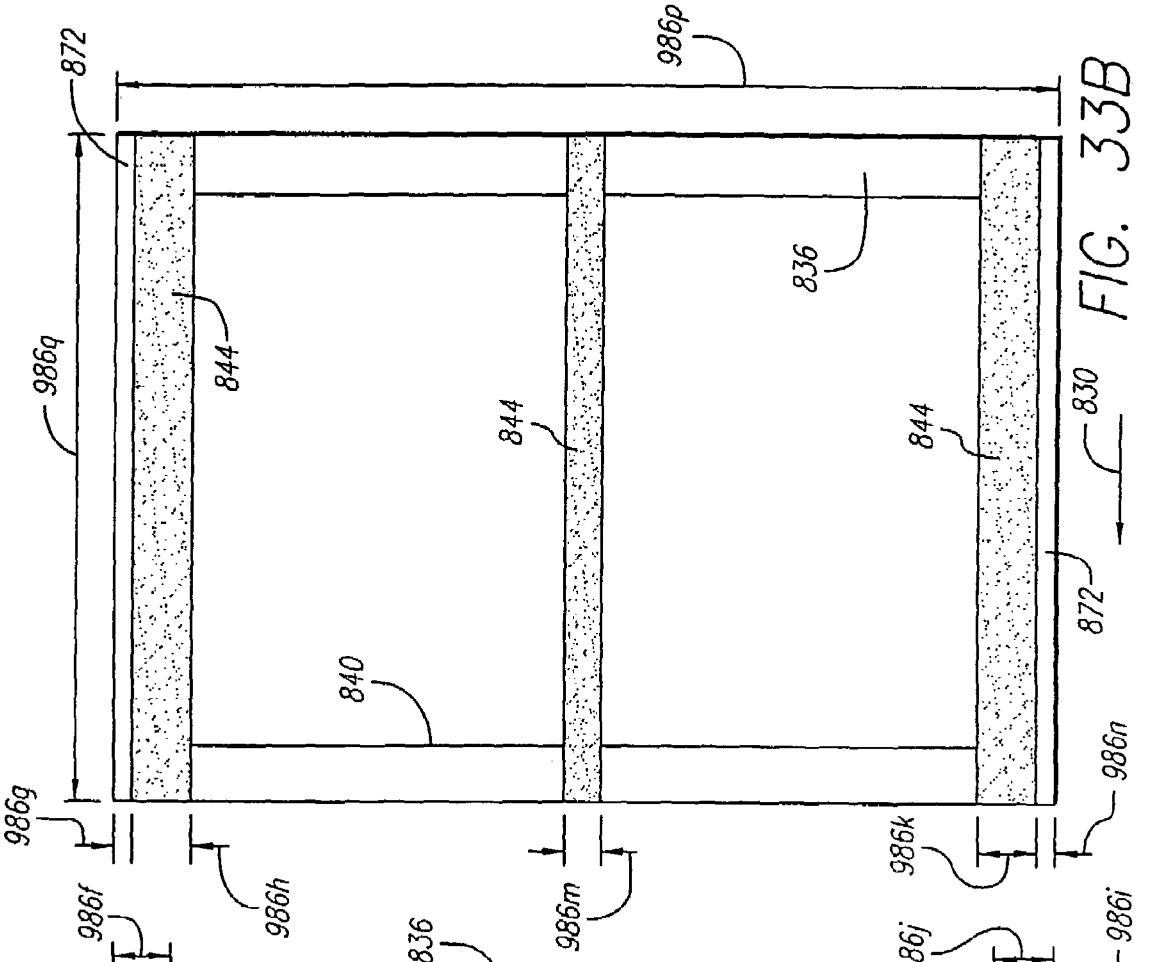
FIGS. 33A and 33B are front and back views of a third version.
Figure 33A:
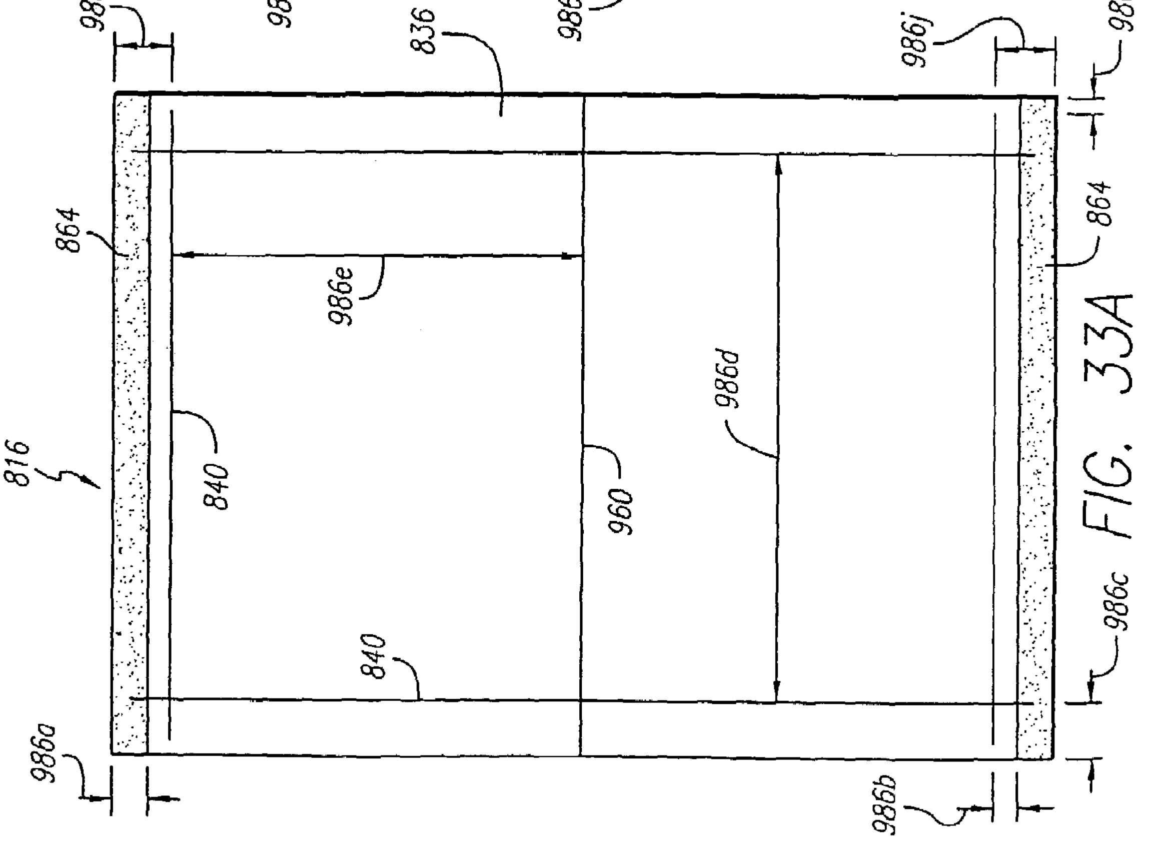
Figure 34B:
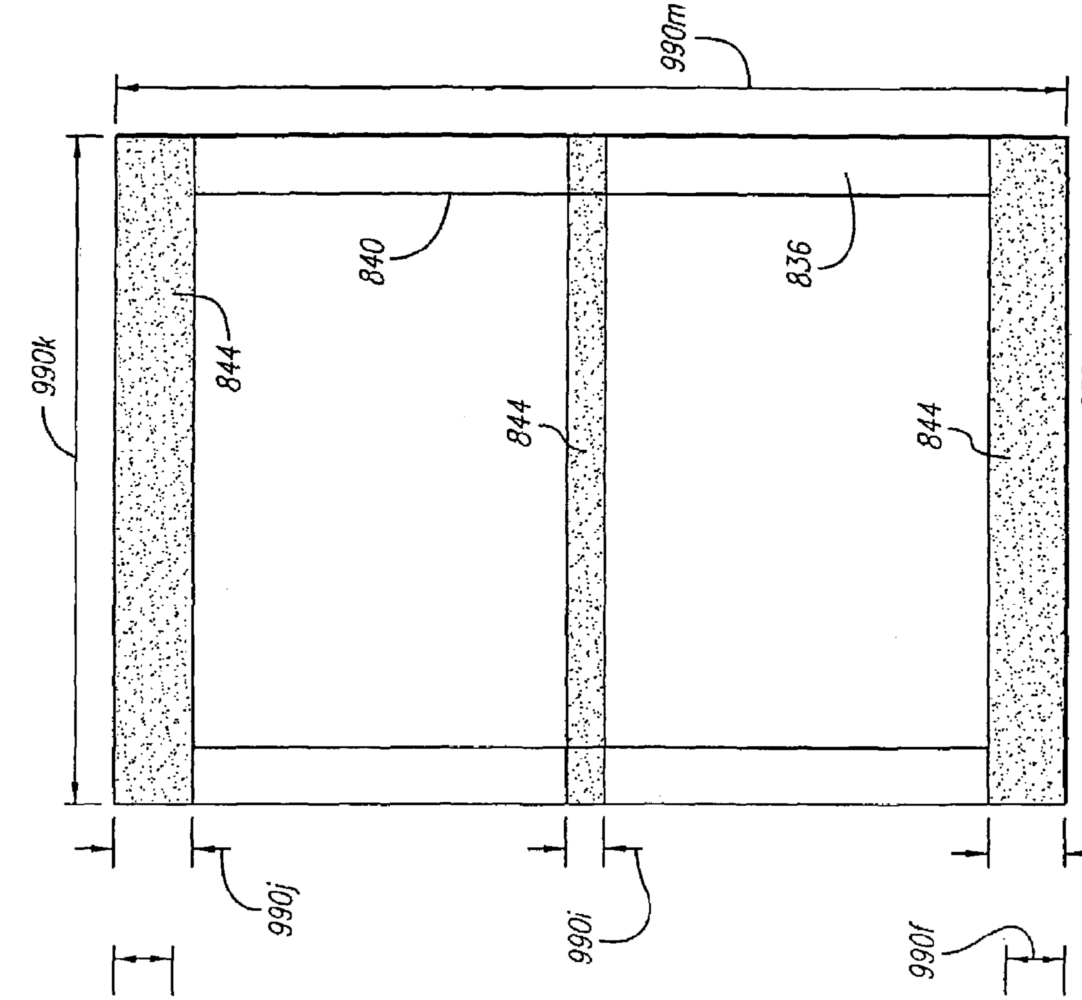
FIGS. 34A and 34B are front and back views of a fourth version.
Figure 34A:
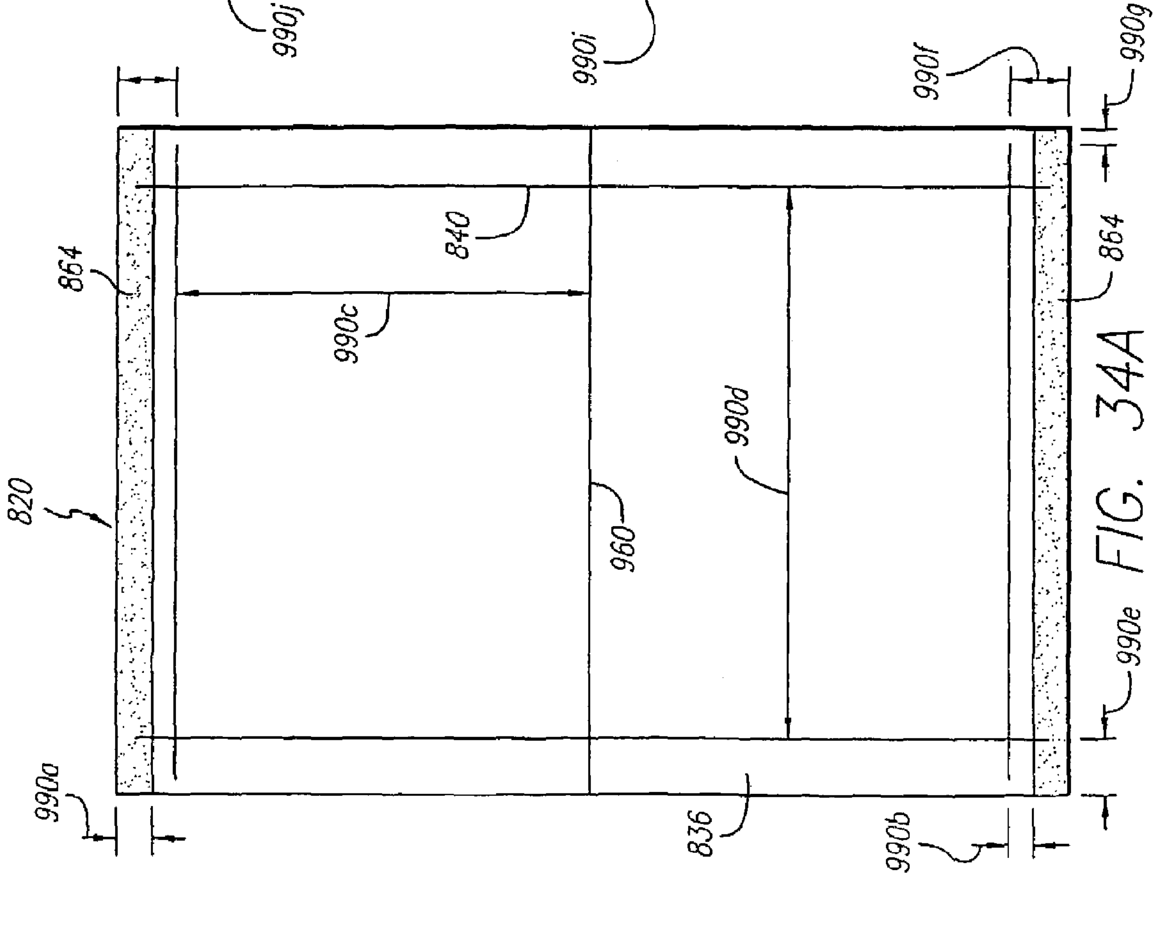
Figures 35A, 35B:
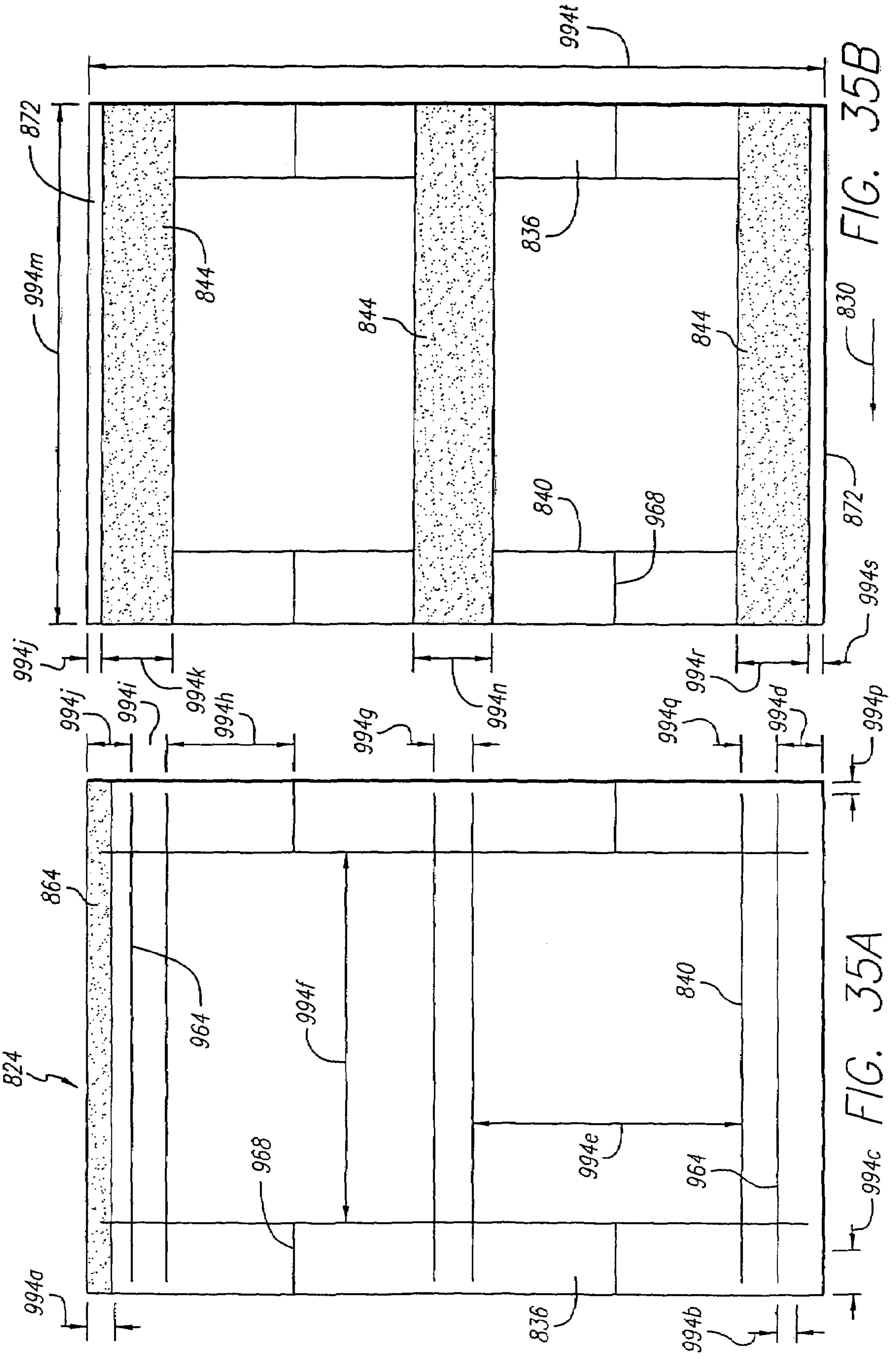
FIGS. 35A and 35B are front and back views, respectively, of a first version postcard sheet construction of the present invention.
Figure 36B:
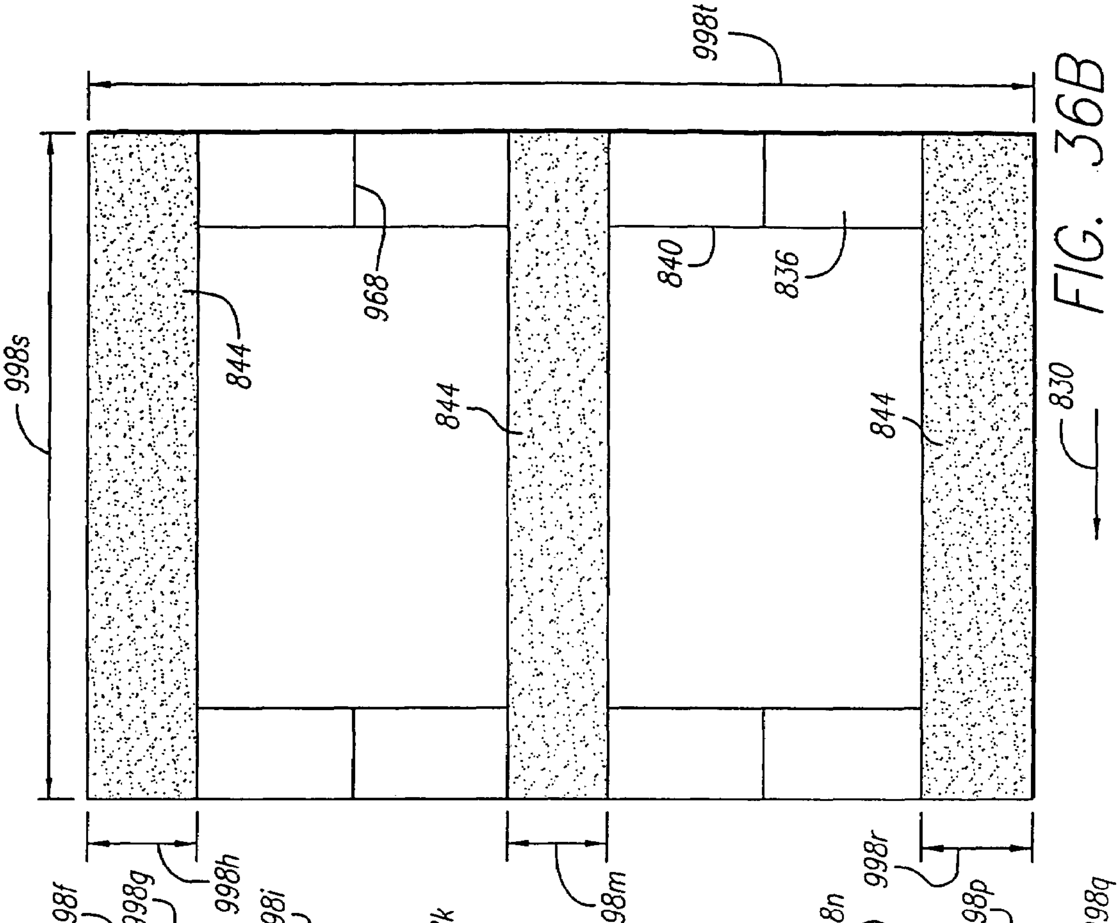
FIGS. 36A and 36B are front and back views, respectively, of a second version postcard sheet construction.
Figure 36A:
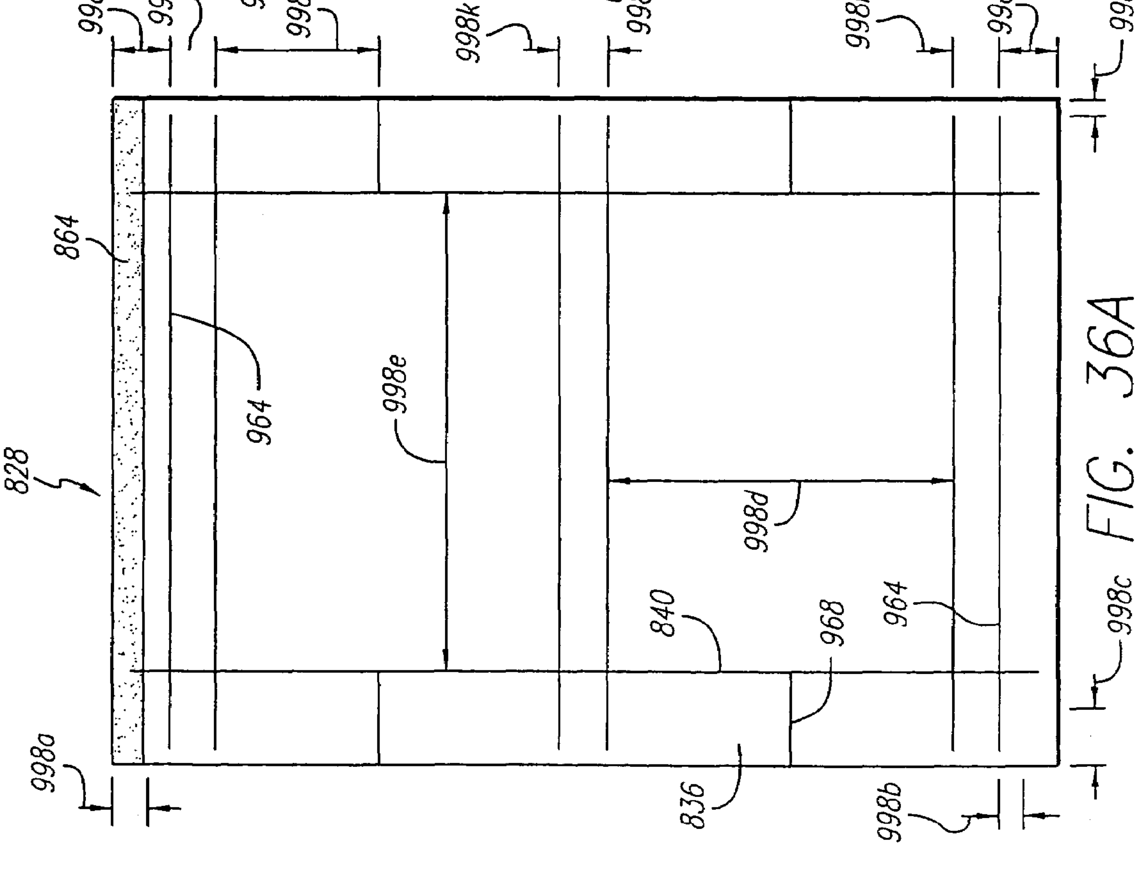

A preferred laminate sheet construction of the present invention is illustrated in FIGS. 29A and 29B generally at 800 and is a significant improvement over the previously-discussed "Paper Direct" prior art product; it represents a first version business card sheet construction of the inventions. A second version business card sheet construction is shown generally at 804 in FIGS. 30A and 30B. The invention can also be readily adapted to applications (printable media) other than business cards, such as greeting cards and post cards. First, second, third and fourth versions of greeting card sheet constructions of the present invention are shown generally at 808, 812, 816 and 820 in FIGS. 31, 32, 33 and 34, respectively. (The "A" and "B" designations for each of FIGS. 29–36 refer to the views of the front and back sides of each of the respective sheet constructions.) Similarly, first and second versions of a post card sheet construction of the invention are shown generally at 824 and 828 in FIGS. 35 and 36. The machine direction is designated by arrow 830. And a cross-sectional view of one or more of the sheet constructions of FIGS. 29–36 is shown generally at 832 in FIG. 37. Variations and alternatives of this cross-sectional view will be discussed later.

Figure 37:
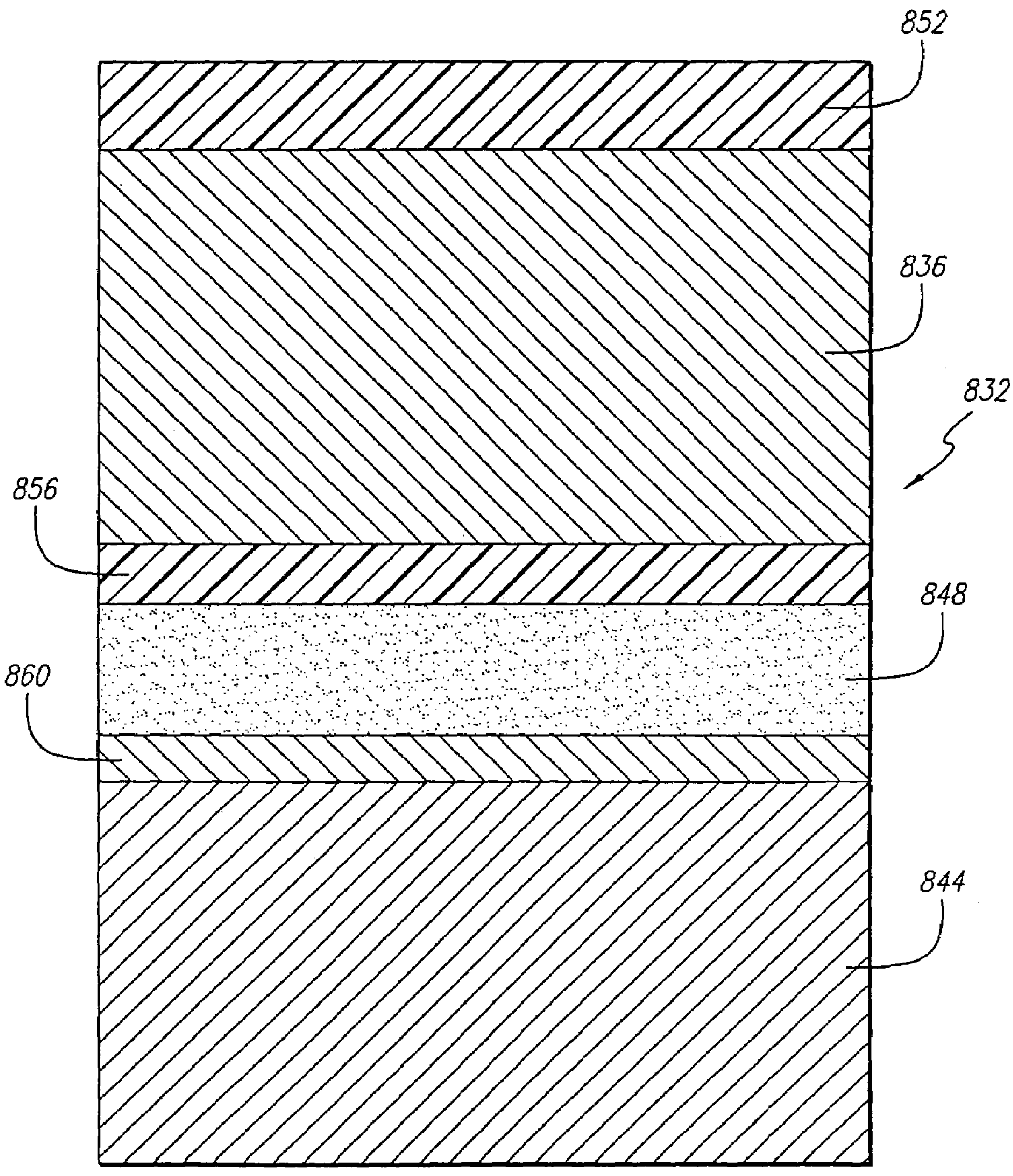
FIG. 37 is an enlarged cross-sectional view taken through one or more of the sheet constructions of FIGS. 29–36.

What all of the sheet constructions of FIGS. 29–36 have in common are a facestock sheet 836, through-cut lines 840 defining at least in substantial part the perimeters of printable media, and liner strips 844 on the back of the sheet covering many of the through-cut lines and holding the sheet together as a sheet construction unit for passage through a copier or printer. The facestock sheet 836 is preferably a cardstock sheet. Referring to FIG. 37, the liner strips 844 are preferably paper strips adhered to the facestock sheet with ultraremovable adhesive 848. The ultraremovable adhesive 848 can be the Fasson water-base acrylic suspension polymer (made per U.S. Pat. No. 5,656,705) or the CleanTac II adhesive available from Moore. As an example, the liner strips 844 can be 50# pre-primed uncoated litho paper (white or canary).

The cardstock sheet 836 may have or include a face coat 852 (FIG. 37), and the face coat can be a laser color-optimized coating or an ink jet color-optimized coating. The ink jet coating, for example, is a color optimized coating provided to enhance the appearance and waterfastness of ink jet inks on selected substrates (cardstocks). The cardstock sheet 836 may also have or include an adhesive-receptive back coat 856. A liner primer coat 860, such as the polyvinyl alcohol based primer with silicate available from Fasson or a primer available from Moore, may also be provided, sandwiched between the layer of adhesive 848 layer and the paper liner or strips 844.

Examples of usable cardstocks 836 are: (1) ink jet (uncoated) (a) Monadnock Paper Mills: 65# Cover (white, mellow white and antique gray) and (b) Monadnock Paper Mills: 100# Text (white, mellow white and antique gray); (2) ink jet (coated) (a) Monadnock Paper Mills: Lightweight C1S (white, mellow white and antique gray), (b) Monadnock Paper Mills: Heavyweight C1S (white, mellow white and antique gray), and (c) Mitsubishi Paper Mills: C1S Glossy (white); (3) laser (uncoated) (a) Fox River Paper Co.: 100# Text (white, natural and cool gray), and (b) Boise Cascade: 100# Offset (white); and (4) laser (coated) (a) Monadnock Paper Mills: C1S w/"Nairobi" or "Harmony" coating (white), and (b) Nakagawa: C1S Magnetic substrate.

Referring to FIG. 37, examples of cross-sectional thicknesses from top to bottom through the sheet construction are: cardstock face coat 852 (approximately 1.0 mil), cardstock 836 (approximately 7.0–9.2 mils), cardstock back coat 856 (approximately 0.1 mil), adhesive layer 848 (approximately 0.20–0.25 mil), liner primer coat 860 (approximately 0.1–0.5 mil), and liner sheet 844 (approximately 2.8–4.0 mils).

To assist the sheet construction in being consistently and accurately picked up and fed into the printer or copier, the infeed edge (and the opposite end) of the sheet construction can be calendered or crushed, as shown in various of the drawing figures at 864. More particularly, the thickness of the infeed end of the sheet (or the laminate web 870 during the manufacturing process—see FIG. 38 and discussions thereof to follow) is reduced by fifteen to twenty-five percent. The calendering can be just of the cardstock 836 and/or the cardstock and the paper liner or strip 844. Alternatively, the paper strip 844 nearest the infeed edge of the sheet construction can be parallel to and spaced and small distance (e.g. one-quarter inch) from the infeed edge of the cardstock, as shown in various figures by reference numeral 872. This reduces the thickness of the infeed end of the sheet construction. Additionally, the uncovered or exposed (one-quarter inch) infeed edge 872 of the cardstock 836 can be calendered, if desired, to further reduce the thickness of the infeed end.

The process(es) for making the sheet constructions of FIGS. 29–36 are similar to the process(es) previously above for making the dry laminate sheet constructions of this invention. They are illustrated schematically in FIG. 38. And referring thereto, the laminate roll 874 (which includes the cardstock 836 laminated to the paper liner 844 with the ultraremovable adhesive 848) is at the roll unwind station 880. One way to form the roll 874 is to at a first site apply the adhesive to the paper and wind it upon itself and then deliver it to a second site where it is laminated to the cardstock to form the roll. Another way to form the roll is for the cardstock to be delivered from the second site to the first where it is laminated and wound, and the roll then delivered to the second site. The roll 874 is unwound with the face side of the web 870 up and the liner side of the web facing down. The web 870 in this orientation passes to the printing station 884 where the printing rollers 888, 892 print the desired indicia (not shown) on the face side of the web (e.g., the cardstock face coat). The indicia can include the distributor's or manufacturer's name and/or logo, product code number, patent number(s), printer feeding directions and so forth.

The printed web 870 then passes to the web turning assembly 896, which flips the web over so that the liner side 870*a* of the web is up and the face side 870*b* is down. The calendering station 900 is next, and it includes an anvil roll 904 and a calendering die 908 which calenders the "infeed" edge of the web. The calendering dies 908 preferably have a random-patterned textured finish. As opposed to a smooth tool, the textured dies 908 grip the web 870 and keep it flat and even during the calendering process. The textured calendered end (864) also assists the printer's rollers to grip the sheet construction for infeeding same.

The web 870 then passes to the face cutting station 916, which includes an anvil roll 920 and a face cutting die 924, and the through-cut lines 840 in the facestock sheet 836 (but not passing into the liner 844) are formed at this station to define perimeters of the printable media (e.g., business cards, greeting cards, post cards, etc.). The liner cutting station 930, which includes the liner cutting die 934 and anvil roller 936, is the next station in this manufacturing process. At this station 930 the continuous liner sheet portion of the web 870 is die cut to form alternating cover strips 844 and waste strips 938 on the back of the cardstock sheet 836. The cover strips 844 cover the horizontal cardstock sheet die-cut lines, that is, the through-cut lines 840, which are width-wise parallel to the infeed edge of the cardstock sheet 836. The waste strips 938 are between the cover strips 844. The (separate) paper waste strips 938 are removed (pulled off) at the removal station 942, which can include a matrix rewind mandrel 946. Alternatively, the waste strips 938 can be removed from the web by a blower system.

The web 870 then passes to the sheeter station 950 where the web is cut or sheeted to the desired (width) dimension, such as 8.5 by eleven inch sheets as shown by a stack of same at 954. The sheets can then be packaged in sets, boxed and distributed to the end user through normal commercial channels as would be known. The sheets are then unpackaged and fed by a user through a printer or copier (see FIGS. 4 and 12) for example for a printing operation on the facestock sheet front (and back) side(s) of the printable media and subsequent separation.

Figure 38:
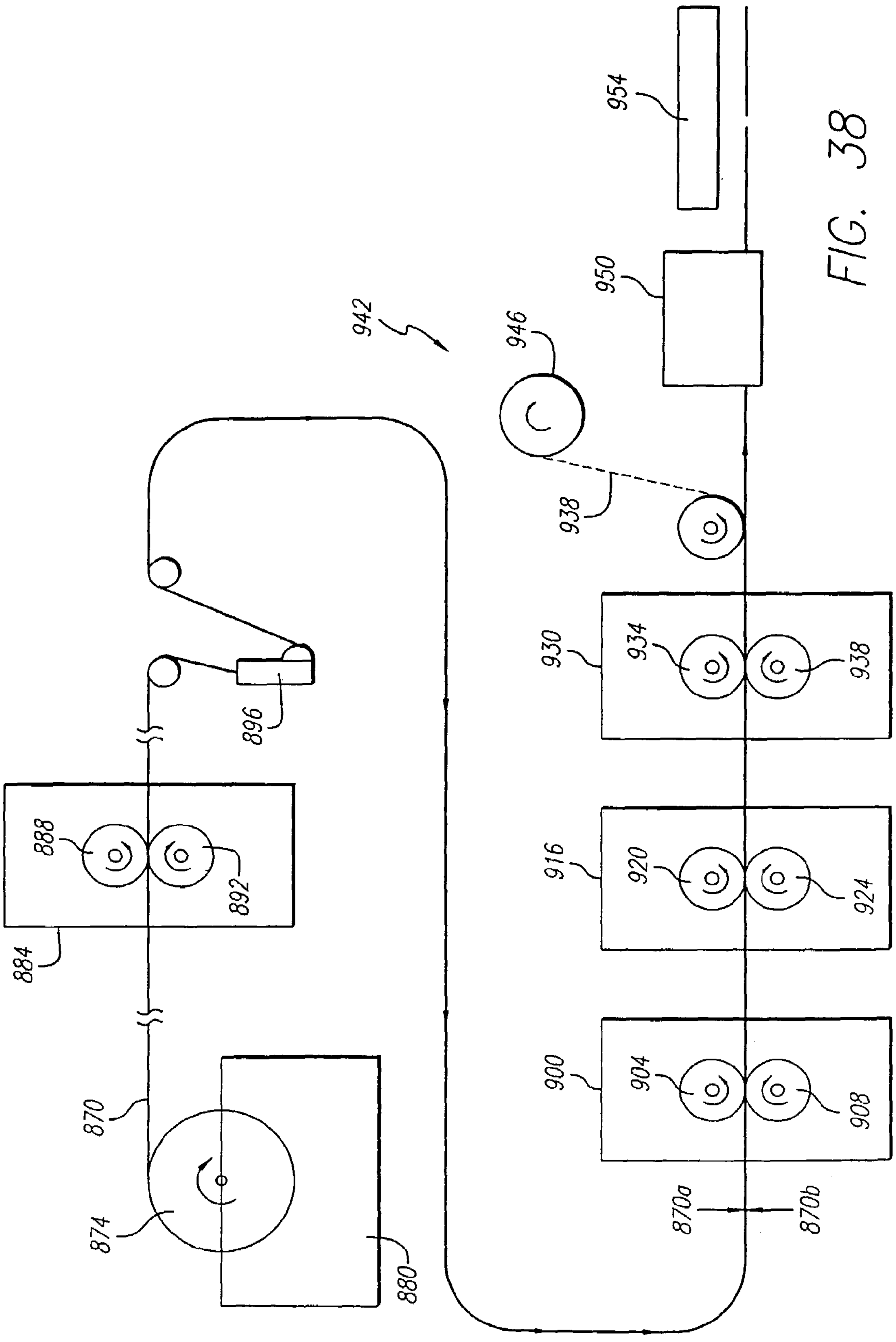
FIG. 38 shows a process for making one or more of the sheet constructions of FIGS. 29–36.

Although a single-web process is illustrated in FIG. 38, it is also within the scope of the present invention to use a dual-web process or system. The single-web process uses an eleven inch wide cardstock laminate web 870. In contrast, a dual-web system, changes the direction of the web through the stations or presses and uses a seventeen-inch wide roll; that is, two side-by-side streams of 8.5 by 8.5 inch web. Some of today's presses allow the wider web width to be processed. An example of the dual-web system is the "Arsoma" press. Unlike the system or process depicted in FIG. 38, a web turning assembly 896 is not provided or needed, because the printing station 884 can print on either the top or bottom of the web 870.

Preferred dimensions and configurations for each of the versions of the business card, greeting card and post card embodiments as depicted in FIGS. 29–36 will now be discussed. Irrespective of which vendor (e.g., Fasson or Moore) is used, the liner sheet 844 and adhesive construction 848 will preferably be the same for each of the embodiments. However, the cardstock 836 would change for the embodiments (as well as for whether the sheet construction is intended for laser or ink jet use). For ink jet use a little bit more ink absorbency is required to allow the dies to penetrate the ink and remain adhered to it. In contrast, for laser printing, a plastic toner is used that is melted on the cardstock 836, so a little bit different surface treatment is needed to obtain good toner anchorage and good heat transfer through the cardstock material to actually bond the plastic to the cardstock.

For the three embodiments, the biggest difference in the cardstock 836 used is the thickness. Business cards are typically thicker and somewhat stiffer than greeting cards and post cards. For example, an average of 8.2–9.0 mils as opposed to an average of 7.4–7.6 mils. The greeting card embodiment would likely have a scored fold line 960 formed at the facestock die cutting station and incorporated in the same die. The post cards are preferably standard four by six inch size; and the additional cut lines 964 at the top and bottom are provide additional flexibility for feeding and passing the sheet construction through the printer or copier.

They can also be provided for the greeting cards. Optional short side perforated lines 968 can also be provided to increase flexibility of the sheet construction.

Preferred dimensions in inches (in parentheses) for construction 800, referring to FIGS. 29A and 29B are 970a (7/16), 970b (1/16), 970c (⅜), 970d (3½), 970e (½), 970f (½), 970g (¾), 970h (¾), 970i (2), 970j (½), 970k (¾), 970 m (8½), and 970n (1½). For construction 804 in FIGS. 30A and 30B, they are 974a (7/16), 974b (1/16), 974c (⅜), 974d (3½), 974e (2), 974f (½), 974g (¼), 974h (½), 974i (½), 974j (8½), 974k (1½), 974m (¾), 974n (11), and 974p (¾). For construction 808 in FIGS. 31A and 31B, they are 978a (7/16), 978b (4⅞), 978c (⅛), 978d (6⅞), 978e (⅝), 978f (1/16), 978g (⅝), 978h (¼), 978i (⅝), 978j (⅝), 978k (¼), 978m (8½), 978n (11), and 978p (13/16). For construction 812 in FIGS. 32A and 32B, they are 982a (7/16), 982b (⅛), 982c (13/16), 982d (6⅞), 982e (4⅞), 982f (⅝), 982g (⅝), 982h (1/16), 982i (⅞), 982j (⅞), 982k (8½) and 982m (11). For construction 816 in FIGS. 33A and 33B, they are 986a (7/16), 986b (⅛), 986c (13/16), 986d (6⅞), 986e (4⅞), 986f (⅝), 986g (¼), 986h (⅝), 986i (1/16), 986j (⅝), 986m (¼), 986n (¼), 986p (11) and 986q (8½). For construction 820 in FIGS. 34A and 34B, they are 990a (7/16), 990b (⅛), 990c (4⅞), 990d (6⅞), (13/16), 990f (⅝), 990g (1/16), 990h (⅞), 990i (¼), 990j (⅞), 990k (8½) and 990m (11). For construction 824 in FIGS. 35A and 35B, they are 994a (7/16), 994b (1/16), 994c (1¼), 994d (⅝), 993e (4), 994f (6), 994g (½), 994h (2), 994i (⅝), 994j (⅝), 994k (1¼), 994m (8½), 994n (1), 994p (1/16), 994q (⅝), 994r (1¼), 994s (¼) and 994t (11). For construction 828 in FIGS. 36A and 36B, they are 998a (7/16), 998b (1/16), 998c (1¼), 998d (4), 998e (6), 998f (⅝), 998g (⅝), 998h (1½), 998i (2), 998k (½), 998m (1), 998n (⅝), 998p (⅝), 998q (1/16), 998r (1½), 998s (8½) and 998t (11).

Instead of providing the full paper liner laminated to the cardstock, die cutting it and removing the waste strips, an alternative manufacturing method of this invention will now be described. A cardstock web (which does not have a paper liner laminated thereto) is unwound from a roll and indicia printed thereon. Cross-direction lines are die cut therethrough, and then individual paper strips are laminated (with ultraremovable adhesive) to the cardstock web at the desired locations. The next step is to machine-direction die cut the web. Calendering of the edge of the web can be done right before the printing step or immediately before the machine-direction die cutting step. After the machine-direction die cutting step, the web is sheeted, and the sheets are stacked, packaged, boxed and distributed.

From the foregoing detailed description, it will be evident that there are a number of changes, adaptations and modifications of the present invention which come within the province of those skilled in the art. For example, the printed media instead of being business cards can be post cards, mini-folded cards, tent cards or photo frames. However, it is intended that all such variations not departing from the spirit of the invention be considered as within the scope thereof.

What is claimed is:

1. A method of forming a printable media sheet construction, comprising:

(a) cutting cross-direction lines through a cardstock web;

(b) after (a), laminating a plurality of strips to the cardstock web;

(c) after (b), cutting machine-direction lines through the cardstock web and to the strips on the opposite side of the cardstock web; and (d) after (c), sheeting the cardstock web into sheets, wherein the cross-direction lines and the machine-direction lines divide the cardstock web into individual separable printable cards on each of the sheets.

2. The method of claim 1 further comprising before (a), printing indicia on the cardstock web.

3. The method of claim 1 further comprising calendering an edge of the cardstock web.

4. The method of claim 3 wherein the calendering is before (a).

5. The method of claim 3 wherein the calendering is after (b) and before (c).

6. The method of claim 1 wherein the laminating uses ultraremovable adhesive.

7. The method of claim 1 wherein the laminating is in the machine direction.

8. The method of claim 1 wherein an ink jet color-optimized coating is on a front face of the cardstock web.

9. The method of claim 1 wherein the cardstock web includes a laser color-optimized coating on a front face thereof.

10. The method of claim 1 wherein the cardstock web includes an adhesive receptive coating on a rear face thereof.

11. The method of claim 1 wherein an infeed end strip of one of the strips is calendered.

12. The method of claim 1 wherein an infeed end strip of one of the strips is parallel to and spaced approximately a quarter of an inch inward from an infeed edge of the cardstock web.

13. The method of claim 1 wherein the cardstock web includes a printer-receptive front coat and a back side adhesive-receptive coat.

14. The method of claim 13 wherein the laminating uses ultraremovable adhesive, the front coat is approximately 1.0 mil thick, the cardstock web is approximately 7.0–9.2 mils thick, the ultraremovable adhesive is approximately 0.20–0.25 mil thick, the adhesive-receptive coat is approximately 0.1–0.5 mil thick, and the strips are approximately 2.8–4.0 mils thick.

15. The method of claim 1 wherein the individual separable printable cards are arranged in a pair of columns with the cards in each column abutting adjacent cards in that column and sharing a common cut line.

16. The method of claim 1 wherein the sheets are 8½x11, 8½x14 or A4 sheets.

17. The method of claim 1 wherein the strips are paper strips.

18. A method of forming a printable media sheet construction, comprising:

(a) cutting cross-direction lines through a cardstock web;

(b) after (a), laminating a plurality of strips to the cardstock web with adhesive directly between the strips and the cardstock web; and (c) after (b), cutting machine-direction lines through the cardstock web and to the strips on the opposite side of the cardstock web.

19. The method of claim 18 further comprising before (a), printing indicia on the cardstock web.

20. The method of claim 18 further comprising calendering an edge of the cardstock web.

21. The method of claim 20 wherein the calendering is before (a).

22. The method of claim 20 wherein the calendering is after (b) and before (c).

23. The method of claim 18 wherein the adhesive is an ultraremovable adhesive.

24. The method of claim 18 further comprising after (c), sheeting the cardstock web into sheets.

25. The method of claim 24 wherein the cardstock web includes a printer-receptive front coat and a back side adhesive-receptive coat.

26. The method of claim 24 wherein the sheets area 8½x11, 8½x14 or A4 sheets.

27. The method of claim 24 wherein the cross-direction lines and the machine-direction lines divide the cardstock web into individual printable cards on each of the sheets.

28. The method of claim 27 wherein the individual printable cards on each of the sheets are arranged in a pair of columns with the cards in each column abutting adjacent cards in that column and sharing a common cut line.

29. The method of claim 18 wherein the cross-direction lines and the machine-direction lines divide at least part of the cardstock web into individual printable cards.

30. The method of claim 18 wherein an ink jet color-optimized coating is on a front face of the cardstock web.

31. The method of claim 18 wherein the cardstock web includes a laser color-optimized coating on a front face thereof.

32. The method of claim 18 wherein the cardstock web includes an adhesive receptive coating on a rear face thereof.

33. The method of claim 18 wherein an infeed end strip of one of the strips is parallel to and spaced approximately a quarter of an inch inward from an infeed edge of the cardstock web.

34. The method of claim 18 wherein the cardstock web includes a printer-receptive front coat and a back side adhesive-receptive coat.

35. The method of claim 34 wherein the adhesive is ultraremovable adhesive, the front coat is approximately 1.0 mil thick, the cardstock web is approximately 7.0–9.2 mils thick, the ultraremovable adhesive is approximately 0.20–0.25 mil thick, the adhesive-receptive coat is approximately 0.1–0.5 mil thick, and the strips are approximately 2.8–4.0 mils thick.

36. The method of claim 18 wherein the strips are paper strips.

37. The method of claim 18 wherein the laminating is in the machine direction.

38. A method of forming a printable media sheet construction, comprising:

(a) cutting cross-direction lines through a cardstock web;

(b) after (a), laminating a plurality of strips to the cardstock web;

(c) after (b), cutting machine-direction lines through the cardstock web and to the strips on the opposite side of the cardstock web; and calendering an edge of the cardstock web.

39. The method of claim 38 wherein the calendering is before (a).

40. The method of claim 38 wherein the calendering is after (b) and before (c).

41. The method of claim 38 wherein the laminating uses ultraremovable adhesive.

42. The method of claim 38 further comprising after (c), sheeting the cardstock web into sheets.

43. The method of claim 38 wherein the cross-direction lines and the machine-direction lines divide at least part of the cardstock web into individual printable cards.

44. A method of forming a printable media sheet construction, comprising:

(a) cutting cross-direction lines through a cardstock web;

(b) after (a), laminating a plurality of ships using ultraremovable adhesive to the cardstock web; and (c) after (b), culling machine-direction lines through the cardstock web and to the strips on the opposite side of the cardstock web.

45. The method of claim 44 wherein an ink jet color-optimized coating is on a front face of the cardstock web.

46. The method of claim 44 wherein the cardstock web includes a laser color-optimized coating on a front face thereof.

47. The method of claim 44 wherein the strips are paper strips.

48. The method of claim 44 further comprising after (c), sheeting the cardstock web into sheets.

49. The method of claim 48 wherein the sheets are 8½x11, 8½x14 or A4 sheets.

50. The method of claim 48 wherein the cross-direction lines and the machine-direction lines divide the cardstock web into individual printable cards on each of the sheets.

51. The method of claim 50 wherein the individual printable cards on each of the sheets are arranged in a pair of columns with the cards in each column abutting adjacent cards in that column and sharing a common cut line.

52. The method of claim 44 wherein the cross-direction lines and the machine-direction lines divide at least part of the cardstock web into individual printable cards.

* * * * *

UNITED STATES PATENT AND TRADEMARK OFFICE

CERTIFICATE OF CORRECTION

PATENT NO. : 7,144,469 B2
APPLICATION NO. : 11/024665
DATED : December 5, 2006
INVENTOR(S) : Brian R. McCarthy et al.

It is certified that error appears in the above-identified patent and that said Letters Patent is hereby corrected as shown below:

Col. 20

Claim 44, line 16: replace “ships” with --strips--.

Claim 44, line 18: replace “culling” with --cutting--.

Signed and Sealed this
Twenty-fifth Day of October, 2011

David J. Kappos

David J. Kappos
*Director of the United States Patent and Trademark Office*